US009663134B2

(12) United States Patent
Imagaki et al.

(10) Patent No.: US 9,663,134 B2
(45) Date of Patent: May 30, 2017

(54) STEERING SYSTEM

(71) Applicant: JTEKT CORPORATION, Osaka-shi, Osaka (JP)

(72) Inventors: Susumu Imagaki, Tondabayashi (JP); Ryota Okano, Hamamatsu (JP); Masayoshi Sakuda, Kashihara (JP); Yuji Takahashi, Obu (JP); Tomonori Sugiura, Yamatokoriyama (JP); Shoji Ishimura, Kashihara (JP); Tatsuro Kubota, Shiki-gun (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/958,250

(22) Filed: Dec. 3, 2015

(65) Prior Publication Data
US 2016/0167691 A1    Jun. 16, 2016

(30) Foreign Application Priority Data

Dec. 12, 2014  (JP) ................................. 2014-252427
Jul. 9, 2015   (JP) ................................. 2015-137999

(51) Int. Cl.
| *B62D 1/184* | (2006.01) |
| *B62D 1/185* | (2006.01) |
| *B62D 1/19*  | (2006.01) |

(52) U.S. Cl.
CPC ............. *B62D 1/185* (2013.01); *B62D 1/184* (2013.01); *B62D 1/192* (2013.01)

(58) Field of Classification Search
CPC ................................ B62D 1/184; B62D 1/185
See application file for complete search history.

(56) References Cited

U.S. PATENT DOCUMENTS

| 9,327,755 B2 * | 5/2016 | Yoshihara ............. B62D 1/184 |
| 2003/0000330 A1 | 1/2003 | Murakami et al. |
| 2008/0236325 A1 * | 10/2008 | Ridgway ................ B62D 1/184 |
| | | 74/493 |
| 2009/0145258 A1 * | 6/2009 | Davies ................... B62D 1/184 |
| | | 74/495 |
| 2013/0118292 A1 * | 5/2013 | Sulser ................... B62D 1/184 |
| | | 74/493 |

(Continued)

FOREIGN PATENT DOCUMENTS

| DE | 102011056351 A1 | 6/2013 |
| JP | 2002-059849 A   | 2/2002 |

OTHER PUBLICATIONS

Apr. 26, 2016 Extended Search Report issued in European Patent Application No. 15193267.5.

*Primary Examiner* — Ruth Ilan
(74) *Attorney, Agent, or Firm* — Oliff PLC

(57) ABSTRACT

A steering system includes an upper jacket that is movable in an axial direction, a first stopper member fixed to the upper jacket, and a second stopper member on a vehicle body. When a lock and unlock mechanism unlocks the upper jacket, the second stopper member moves to an advanced position where the second stopper member faces the first stopper member in the axial direction. When the lock and unlock mechanism locks the upper jacket, the second stopper member moves to a retracted position where the second stopper member retracts from the advanced position.

12 Claims, 16 Drawing Sheets

(56) References Cited

U.S. PATENT DOCUMENTS

| | | | |
|---|---|---|---|
| 2014/0026707 A1* | 1/2014 | Yokota | B62D 1/184 74/493 |
| 2014/0137694 A1 | 5/2014 | Sugiura | |
| 2015/0266495 A1* | 9/2015 | Yoshihara | B62D 1/195 74/493 |
| 2015/0266496 A1* | 9/2015 | Yoshihara | B62D 1/195 74/493 |
| 2015/0266499 A1* | 9/2015 | Yoshihara | B62D 1/184 74/493 |
| 2015/0375771 A1* | 12/2015 | Tinnin | G05G 5/04 74/493 |
| 2016/0280248 A1* | 9/2016 | Uesaka | B62D 1/195 |

* cited by examiner

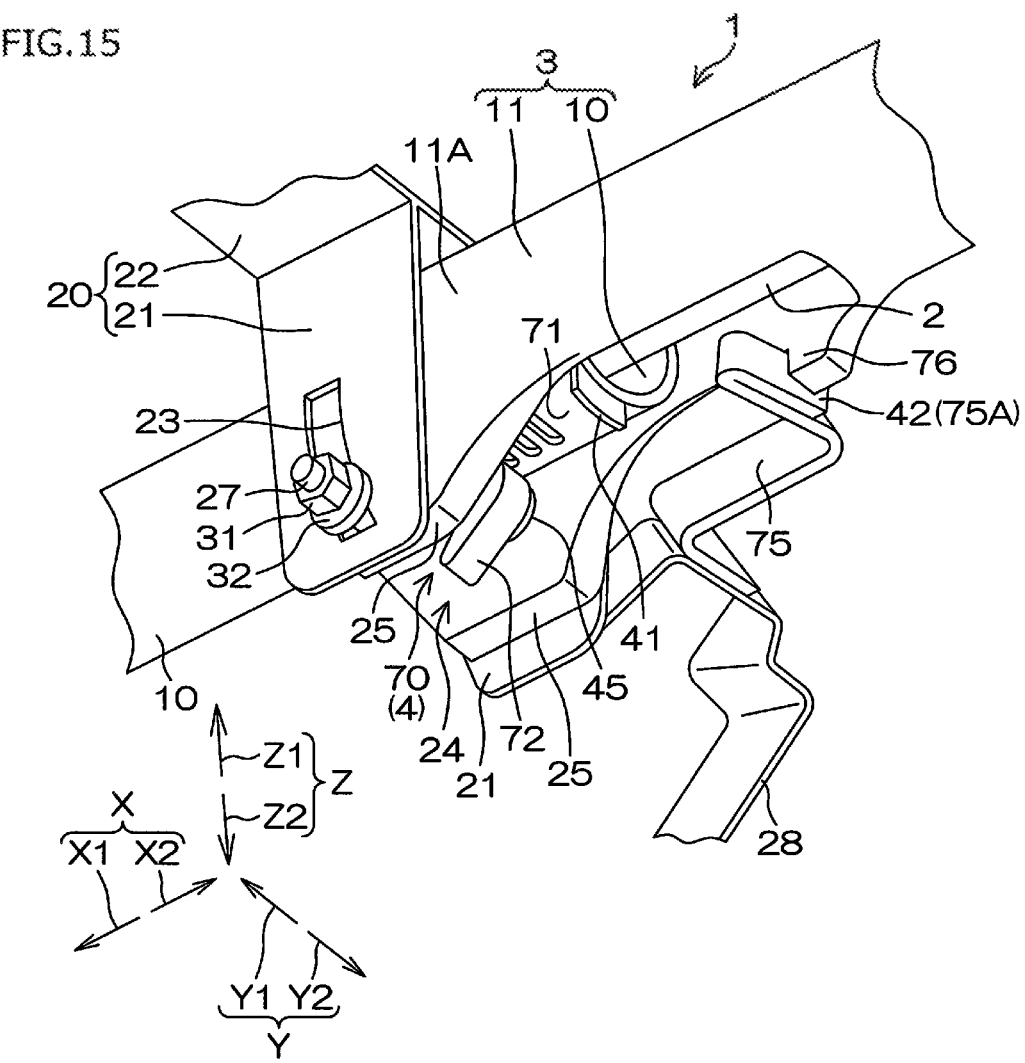

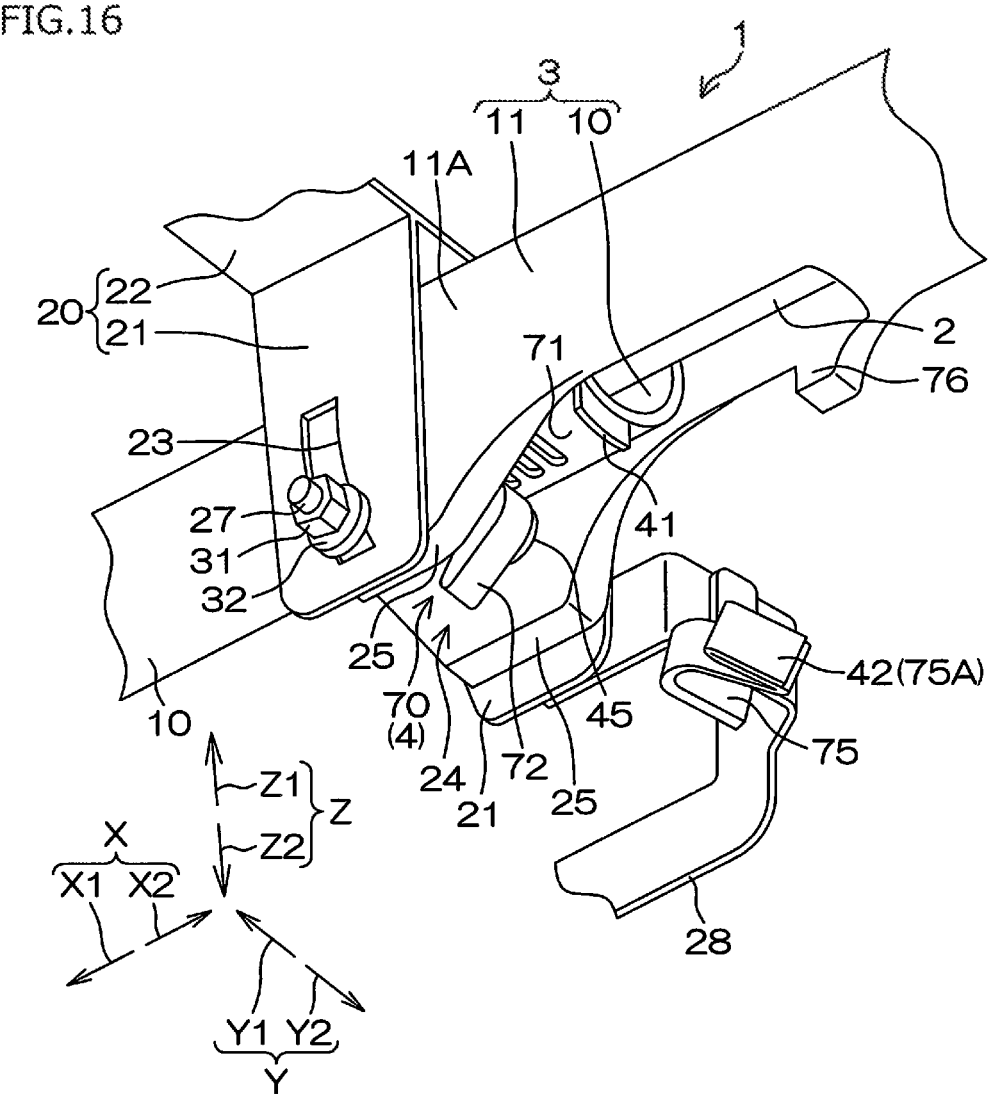

STEERING SYSTEM

INCORPORATION BY REFERENCE

The disclosures of Japanese Patent Applications No. 2014-252427 and No. 2015-137999 respectively filed on Dec. 12, 2014 and Jul. 9, 2015, each including the specification, drawings and abstract, are incorporated herein by reference in their entireties.

BACKGROUND OF THE INVENTION

1. Field of the Invention

The invention relates to a steering system.

2. Description of Related Art

In a vehicular steering system disclosed in Japanese Patent Application Publication No. 2002-59849 (JP 2002-59849 A), a steering column supports a steering shaft that supports a steering wheel so that the steering shaft is rotatable. The steering column includes an inner column on the upper side and an outer column on the lower side that is fitted over the inner column. The steering column has a telescopic structure. During telescopic extension and contraction adjustment, the inner column is slid with respect to the outer column in an axial direction to adjust the position of the steering wheel in the axial direction.

The outer column is provided with a substantially U-shaped holder. A tubular stopper protrusion is formed on a lower part of a bent portion of the holder. The stopper protrusion is engaged with an axial slot in the inner column.

During the telescopic extension and contraction adjustment, the stopper protrusion can move within the axial slot in the inner column. The stopper protrusion comes into contact with an end of the axial slot to serve as a stopper for the inner column in the axial direction.

In the steering system in JP 2002-59849 A, when a configuration is adopted in which, at the time of a vehicular collision, the inner column is released in order to absorb impact, the release of the inner column may be hindered by the stopper protrusion coming into contact with the end of the axial slot in the inner column.

SUMMARY OF THE INVENTION

It is an object of the present invention to provide a steering system in which an upper jacket moves to adjust extension and contraction of a column jacket and release of the upper jacket at the time of a vehicular collision is not hindered by a stopper member that restricts movement of the upper jacket so that the distance the upper jacket moves does not exceed a predetermined distance during the extension and contraction adjustment.

According to an aspect of the present invention, a steering system includes:

a steering member;

a steering shaft to which the steering member is coupled at one end of the steering shaft and which can extend and contract in an axial direction;

a column jacket having an upper jacket that supports the steering shaft on a side near the steering member, and a lower jacket fixed to a vehicle body to support the steering shaft on the opposite side from the steering member in the axial direction, the column jacket being enabled to extend and contract in the axial direction along with the steering shaft by movement of the upper jacket in the axial direction;

an operation member operated to perform extension and contraction adjustment on the column jacket;

a lock and unlock mechanism that locks and unlocks the upper jacket in the axial direction in conjunction with an operation of the operation member;

a releasing mechanism that releases the upper jacket toward the opposite side at a time of a vehicular collision;

a first stopper member fixed to an outer side surface of the upper jacket; and a second stopper member that is supported on the vehicle body, moves in conjunction with the operation of the operation member to an advanced position where the second stopper member faces the first stopper member in the axial direction when the lock and unlock mechanism unlocks the upper jacket, and that moves in conjunction with the operation of the operation member to a retracted position where the second stopper member is retracted from the advanced position when the lock and unlock mechanism locks the upper jacket.

According to the steering system of the above aspect, in the steering system, the column jacket that can extend and contract in the axial direction along with the steering shaft has the upper jacket that supports the steering shaft on the side near the steering member and the lower jacket that supports the steering shaft on the opposite side from the steering member in the axial direction. The lower jacket is fixed to the vehicle body. The upper jacket moves in the axial direction, so that the column jacket extends and contracts.

The lock and unlock mechanism unlocks the upper jacket in the axial direction in conjunction with the operation of the operation member, which allows the extension and contraction adjustment to be performed on the column jacket. After the extension and contraction adjustment, the operation member is operated to allow the lock and unlock mechanism to lock the upper jacket in the axial direction. At the time of a vehicular collision, the releasing mechanism releases the upper jacket toward the opposite side.

The first stopper member is fixed to the outer side surface of the upper jacket, and the second stopper member is supported on the vehicle body. When the lock and unlock mechanism unlocks the upper jacket, the second stopper member moves to the advanced position in conjunction with the operation of the operation member. In the advanced position, the second stopper member faces the first stopper member in the axial direction. Thus, during the extension and contraction adjustment of the column jacket, the second stopper member comes into contact, in the axial direction, with the first stopper member moving along with the upper jacket. Consequently, movement of the upper jacket is restricted so that the distance the upper jacket moves does not exceed a predetermined distance.

When the lock and unlock mechanism locks the upper jacket, the second stopper member moves to the retracted position where the second stopper member is retracted from the advanced position in conjunction with the operation of the operation member. Thus, the second stopper member at the retracted position does not face the first stopper member in the axial direction. Therefore, at the time of a vehicular collision, the second stopper member does not come into contact with the first stopper member in the axial direction. The upper jacket can thus be smoothly released.

As a result, the release of the upper jacket at the time of a vehicular collision is not hindered by the first stopper member and the second stopper member that restricts movement of the upper jacket so that the distance the upper jacket moves does not exceed the predetermined distance during the extension and contraction adjustment of the column jacket

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 15 is a perspective view of the main part of the steering system according to the second variation as viewed from a lower side; and FIG. 16 is a diagram depicting a part of the steering system in a locked state that corresponds to FIG. 15.

DETAILED DESCRIPTION OF EMBODIMENTS

An embodiment of the present invention will be described below in detail with reference to the attached drawings.

Figure 1:
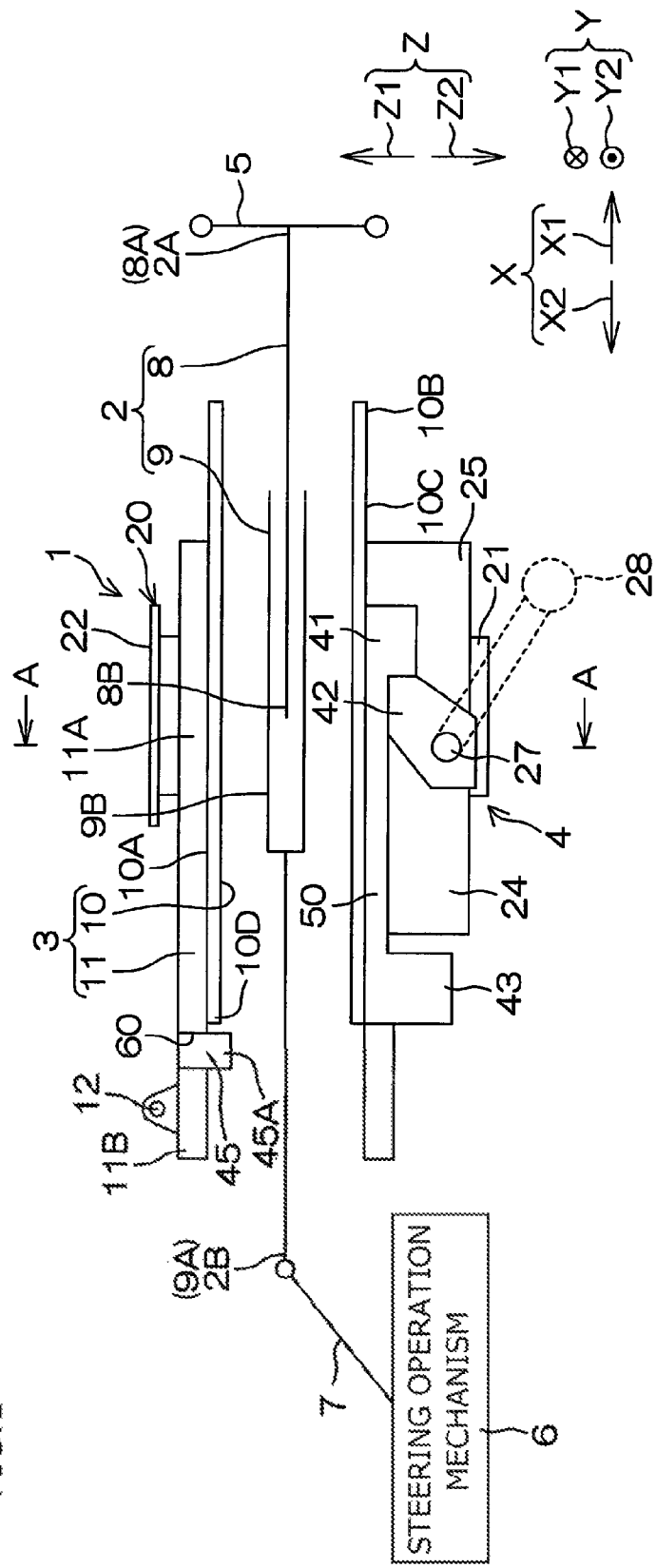
FIG. 1 is a schematic diagram of a steering system according to an embodiment of the present invention, depicting a maximally contracted column jacket.

FIG. 1 is a schematic diagram of a steering system 1 according to an embodiment of the present invention. In FIG. 1, the left side of the drawing plane of FIG. 1 corresponds to a front side of a vehicle body (not depicted in the drawings) to which the steering system 1 is attached. The right side of the drawing plane corresponds to a rear side of the vehicle body, the upper side of the drawing plane corresponds to an upper side of the vehicle body, and the lower side of the drawing plane corresponds to a lower side of the vehicle body.

Referring to FIG. 1, the steering system 1 mainly includes a steering shaft 2, a column jacket 3, and a lock and unlock mechanism 4.

A steering member 5 is coupled to an end 2A of the steering shaft 2 that is a rear end thereof. The other end 2B of the steering shaft 2 that is a front end thereof is coupled to a pinion shaft 7 of a steering operation mechanism 6 via a universal joint, an intermediate shaft (not depicted in the drawings), and the like in order. The steering operation mechanism 6 includes a rack and pinion mechanism. The steering operation mechanism 6 steers steered wheels not depicted in the drawings in response to transmission of rotation of the steering shaft 2.

The steering shaft 2 extends in a front-rear direction of the vehicle body. A direction in which the steering shaft 2 extends is hereinafter referred to as an axial direction X. In FIG. 1, the axial direction X extends along a horizontal direction. However, the axial direction X is actually inclined to the horizontal direction such that the end 2B is lower than the end 2A. A rear side corresponding to the steering member 5 side in the axial direction X is denoted by reference character X1. A front side opposite from the steering member 5 side in the axial direction is denoted by reference character X2.

Among directions crossing the axial direction X, a direction perpendicular to the drawing plane of FIG. 1 is referred to as a lateral direction Y. A direction extending generally up and down in FIG. 1 is referred to as an up-down direction Z. In the lateral direction Y, a side in FIG. 1 that faces away the viewer represents a right side Y1. A side in FIG. 1 that faces the viewer represents a left side Y2. In the up-down direction Z, an upper side is denoted by reference character Z1. A lower side is denoted by reference character Z2.

In the figures subsequent to FIG. 1, the same reference characters as those in FIG. 1 are used to denote the directions corresponding to the axial direction X, the rear side X1, the front side X2, the lateral direction Y, the right side Y1, the left side Y2, the up-down direction Z, the upper side Z1, and the lower side Z2.

The steering shaft 2 has a cylindrical upper shaft 8 that is elongated in the axial direction X and a lower shaft 9 that is cylindrical at least at a rear end thereof. The upper shaft 8 is disposed on the rear side X1 with respect to the lower shaft 9 coaxially with the lower shaft 9. A rear end 8A of the upper shaft 8 corresponds to the end 2A of the steering shaft 2. A front end 9A of the lower shaft 9 corresponds to the end 2B of the steering shaft 2. A front end 8B of the upper shaft 8 is inserted from the rear side X1 into a cylindrical rear end 9B of the lower shaft 9. The upper shaft 8 and the lower shaft 9 are fitted together by spline fitting or serration fitting. Thus, the upper shaft 8 and the lower shaft 9 can rotate integrally and move relative to each other along the axial direction X. The steering shaft 2 can be extended and contracted in the axial direction X by moving the upper shaft 8 in the axial direction X relative to the lower shaft 9.

The column jacket 3 is generally a hollow member extending in the axial direction X. The column jacket 3 houses the steering shaft 2. The column jacket 3 has a cylindrical upper jacket 10 and a cylindrical lower jacket 11 that extend in the axial direction X.

The upper jacket 10 is positioned on the rear side X1 with respect to the lower jacket 11 coaxially with the lower jacket 11. The lower jacket 11 houses a part of the upper jacket 10. More specifically, a front portion 10A of the upper jacket 10 is inserted from the rear side X1 into a rear portion 11A of the lower jacket 11. In this state, the upper jacket 10 can move in the axial direction X relative to the lower jacket 11. This relative movement enables the whole column jacket 3 to be extended and contracted in the axial direction X.

The column jacket 3 supports the steering shaft 2 via bearings (not depicted in the drawings) so that the steering shaft 2 is rotatable. Specifically, a rear end 10B of the upper jacket 10 is coupled to the upper shaft 8 via a bearing. The upper jacket 10 supports the upper shaft 8 via the bearing so that the upper shaft 8 is rotatable. A front end 11B of the lower jacket 11 is coupled to the lower shaft 9 via a bearing. The lower jacket 11 supports the lower shaft 9 via the bearing so that the lower shaft 9 is rotatable.

The upper shaft 8 and the upper jacket 10 coupled together are movable in the axial direction X relative to the lower shaft 9 and the lower jacket 11 coupled together. Thus, the column jacket 3 can be extended and contracted in the axial direction X along with the steering shaft 2.

Figure 5:
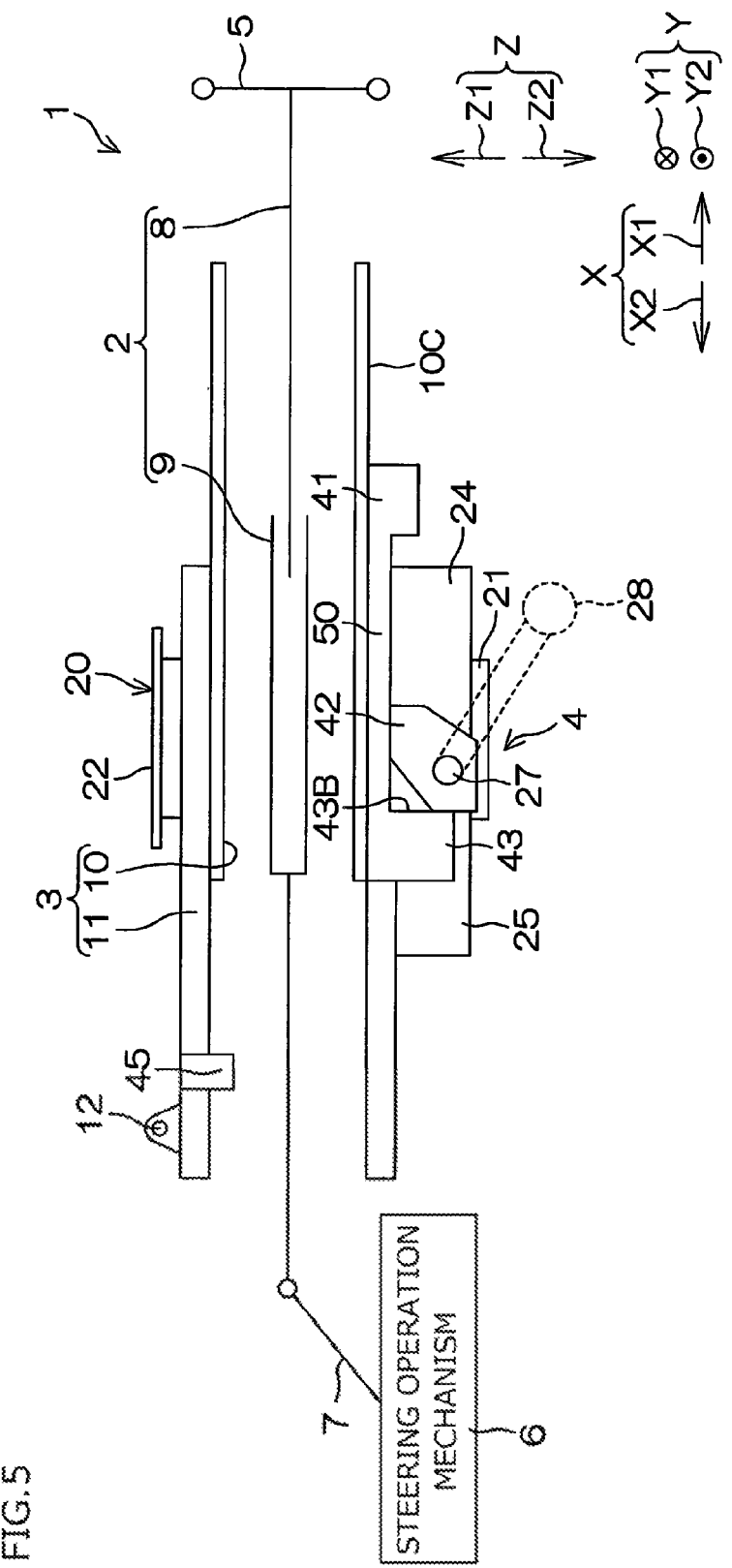
FIG. 5 is a diagram corresponding to FIG. 1 and depicting the maximally extended column jacket.

The extension and contraction of the steering shaft 2 and the column jacket 3 are referred to as telescopic extension and contraction. This extension and contraction adjustment, in other words, telescopic positional adjustment for the steering member 5 in the axial direction X is referred to as telescopic adjustment. FIG. 1 illustrates the steering member 5 and the upper jacket 10 placed, through the telescopic adjustment, at a short position that is the foremost position on the front side X2, and the maximally contracted steering shaft 2 and column jacket 3. The position of the steering member 5 and the upper jacket 10 placed, through the telescopic adjustment, at the rearmost position on the rear side X1 are referred to as a long position (see FIG. 5 described below). When the steering member 5 and the upper jacket 10 are located at the long position, the steering shaft 2 and the column jacket 3 are maximally extended.

The front end 11B of the lower jacket 11 is coupled to the vehicle body via a tilt shaft 12 extending in the lateral direction Y. Thus, the lower jacket 11 is fixed to the vehicle body. The column jacket 3 as a whole can be tilted up and down around the tilt shaft 12 along with the steering shaft 2. A general up-down direction around the tilt shaft 12 is referred to as a tilt direction. Directional adjustment of the steering member 5 by tilting is referred to as tilt adjustment.

Figure 2:
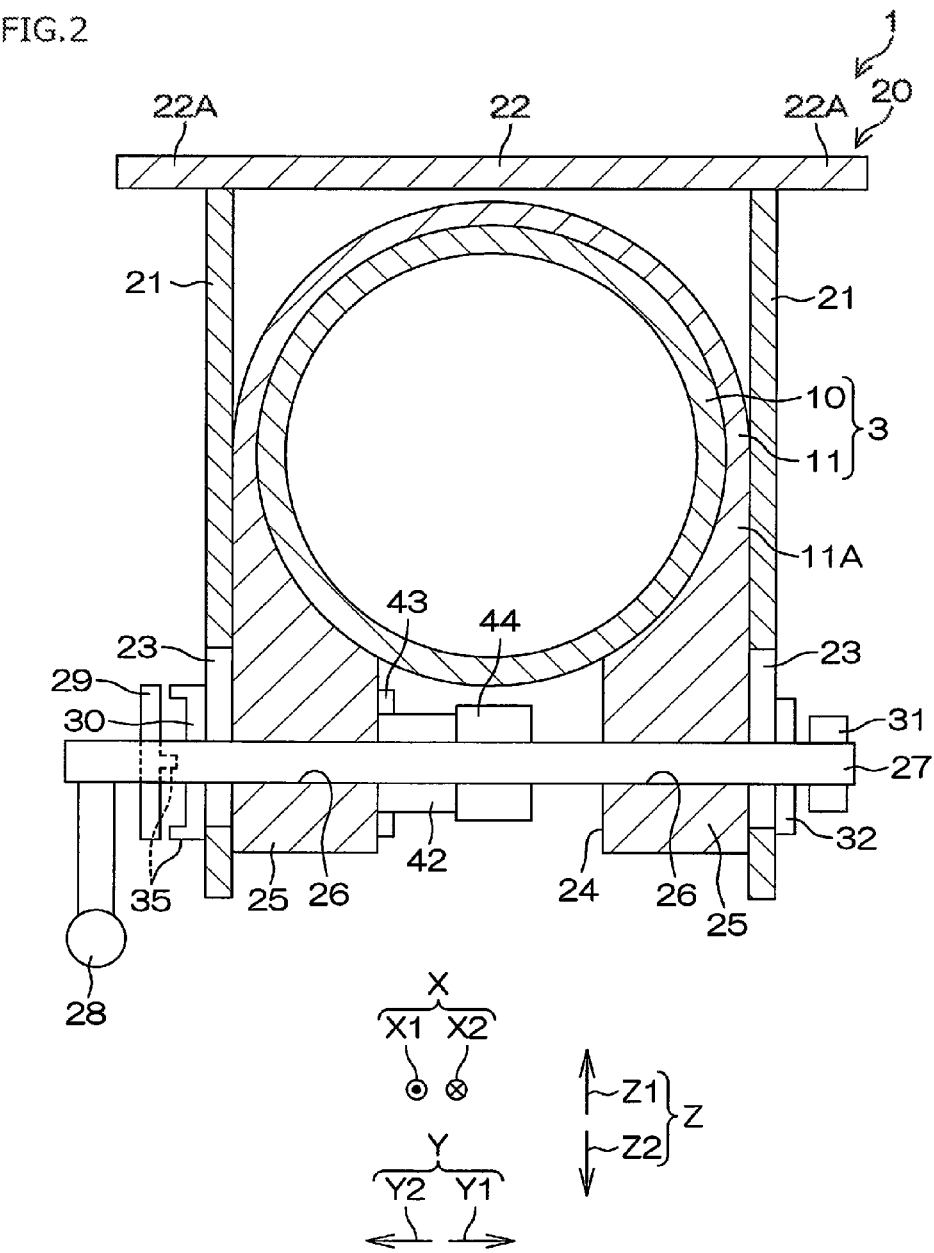
FIG. 2 is a sectional view taken along line A-A in FIG. 1.

The steering system 1 is coupled to the vehicle body and includes a bracket 20 that supports a rear side X1 part of the lower jacket 11. FIG. 2 is a sectional view taken along A-A in FIG. 1. Referring to FIG. 2, the bracket 20 is shaped like a groove that is open downward and formed symmetrically with respect to the column jacket 3 so as to have a general U shape turned upside down as viewed in the axial direction X. Specifically, the bracket 20 integrally includes a pair of side plates 21 and a coupling plate 22. The side plates 21 are thin in the lateral direction Y and confront each other through the column jacket 3 in the lateral direction Y. the coupling plate 22 is coupled to upper ends of the side plates 21 and is thin in the up-down direction Z.

Tilt grooves 23 are formed in the respective side plates 21 at the same position as viewed in the lateral direction Y. The tilt grooves 23 extend in the up-down direction Z, to be exact, in the above-described tilt direction. The coupling plate 22 has portions 22A extending outward with respect to the side plates 21 in the lateral direction Y. The bracket 20 as a whole is fixed to the vehicle body via bolts (not depicted in the drawings) or the like inserted through the portions 22A.

In the rear portion 11A of the lower jacket 11, a slit 24 is formed which extends in the axial direction X so as to penetrate a lower end of the lower jacket 11 in the up-down direction Z. In the rear portion 11A of the lower jacket 11, a pair of support portions 25 is integrally provided. The support portions 25 are each shaped like a block extending toward the lower side Z2, and each define the slit 24 in the lateral direction Y.

In each of the support portions 25, a circular through-hole 26 is formed which penetrates the support portion 25 in the lateral direction Y. The through-holes 26 in the support portions 25 are located at the same position as viewed in the lateral direction Y and overlap parts of the tilt grooves 23 in the side plates 21 of the bracket 20.

The lock and unlock mechanism 4 is a mechanism that allows locking of the steering member 5 (see FIG. 1) on which the tilt adjustment or the telescopic adjustment has been completely performed and unlocking of the position of the steering member 5 for the tilt adjustment or the telescopic adjustment.

In connection with the lock and unlock mechanism 4, the steering system 1 includes a rotating shaft 27 and an operation member 28. The rotating shaft 27 is shaped like a rod extending in the lateral direction Y and is inserted through the through-holes 26 and the tilt grooves 23. The rotating shaft 27 is supported by the side plates 21 of the bracket 20 on the lower side Z2 with respect to the upper jacket 10. The operation member 28 is a graspable lever and is coupled to a left end of the rotating shaft 27 that is positioned on the left side Y2 with respect to the side plate 21 on the left side Y2, so as to be integrated with the rotating shaft 27. Since the lower jacket 11 is fixed to the vehicle body as described above, the operation member 28 is supported by the lower jacket 11 via the rotating shaft 27 inserted through the through-holes 26 in the support portions 25 of the lower jacket 11. The operation member 28 is operated by a driver or the like so as to be twisted in the front-rear direction and in the up-down direction for the telescopic adjustment or the tilt adjustment. The rotating shaft 27 rotates in conjunction with operation of the operation member 28.

The lock and unlock mechanism 4 includes a ring-like cam 29, a cam follower 30, a nut 31, and an interposed member 32. The rotating shaft 27 and the operation member 28 may be considered to be parts of the lock and unlock mechanism 4.

A portion of a left end of the rotating shaft 27 between the operation member 28 and the side plate 21 on the left side Y2 is inserted from the left side Y2 through the cam 29 and the cam follower 30 in this order. The cam 29 can rotate integrally with the rotating shaft 27, whereas the cam follower 30 can rotate relative to the rotating shaft 27 and move in the lateral direction Y.

The nut 31 is attached to a right end of the rotating shaft 27 that is positioned on the right side Y1 with respect to the side plate 21 on the right side Y1. A portion of the rotating shaft 27 between the nut 31 and the right side plate 21 is inserted through the interposed member 32. Between the interposed member 32 and the nut 31, a needle roller bearing or a thrust washer may be interposed in order to reduce friction between the interposed member 32 and the nut 31.

The rotating shaft 27 can move through the tilt grooves 23 in the bracket 20 in the above-described tilt direction. When the driver or the like moves the steering member 5 in the up-down direction Z for the tilt adjustment, the column jacket 3 is tilted to the extent that the rotating shaft 27 can move through the tilt grooves 23.

When the driver tilts the operation member 28 around the rotating shaft 27 after performing the telescopic adjustment or the tilt adjustment, the cam 29 rotates along with the rotating shaft 27, and cam protrusions 35 formed on the cam 29 and the cam follower 30 move onto each other. Thus, the cam follower 30 moves toward the right side Y1 along the rotating shaft 27 and is pressed against the side plate 21 on the left side Y2. Consequently, the side plates 21 are clamped between the cam follower 30 and the interposed member 32 from the opposite sides in the lateral direction Y, which causes a frictional force between each of the side plates 21 and the corresponding support portion 25. The frictional force causes locking of the column jacket 3 in position in the tilt direction, and the steering member 5 is locked at a position resulting from the tilt adjustment.

The support portions 25 are sandwiched between the side plates 21 to reduce the distance between the support portions 25. Thus, an inner peripheral portion of the lower jacket 11 is narrowed to cause the lower jacket 11 to externally compress the upper jacket 10 in the lower jacket 11. As a result, a frictional force is exerted between the upper jacket 10 and the lower jacket 11. The upper jacket 10 is thus locked in position in the axial direction X, and the steering member 5 is locked at a position resulting from the telescopic adjustment.

A state of the steering system 1 where the position of the steering member 5 is fixed in the tilt direction and the axial direction X as described above is referred to as a locked state. In the steering system 1 in the locked state, the position of the operation member 28 in the tilt direction around the rotating shaft 27 is referred to as a locked position.

In the steering system 1 in the locked state, when the operation member 28 is tilted in a direction opposite to the above-described direction, the cam 29 rotates with respect to the cam follower 30, and the cam protrusions 35 on the cam 29 and the cam follower 30 are separated from each other. Thus, the cam follower 30 moves toward the left side Y2 along the rotating shaft 27. The side plates 21 between the cam follower 30 and the interposed member 32 are then unclamped. Consequently, the above-described frictional force is eliminated, which allows the steering member 5 to move in the axial direction X and the tilt direction. This enables the telescopic adjustment or the tilt adjustment to be performed on the steering member 5 again.

A state of the steering system 1 where the steering member 5 is not locked in position in the tilt direction and the axial direction X is referred to as an unlocked state. In the steering system 1 in the unlocked state, the position of the operation member 28 in the rotating direction around the rotating shaft 27 is referred to as an unlocked position.

As described above, the lock and unlock mechanism 4 brings the steering system 1 to the locked state to lock the upper jacket 10 in the axial direction X and the tilt direction or brings the steering system 1 to the unlocked state to unlock the upper jacket 10, in conjunction with the operation of the operation member 28. The steering system 1 in the present embodiment enables both the telescopic adjustment and the tilt adjustment. However, the tilt adjustment may be omitted and only the telescopic adjustment is enabled.

Figure 3:
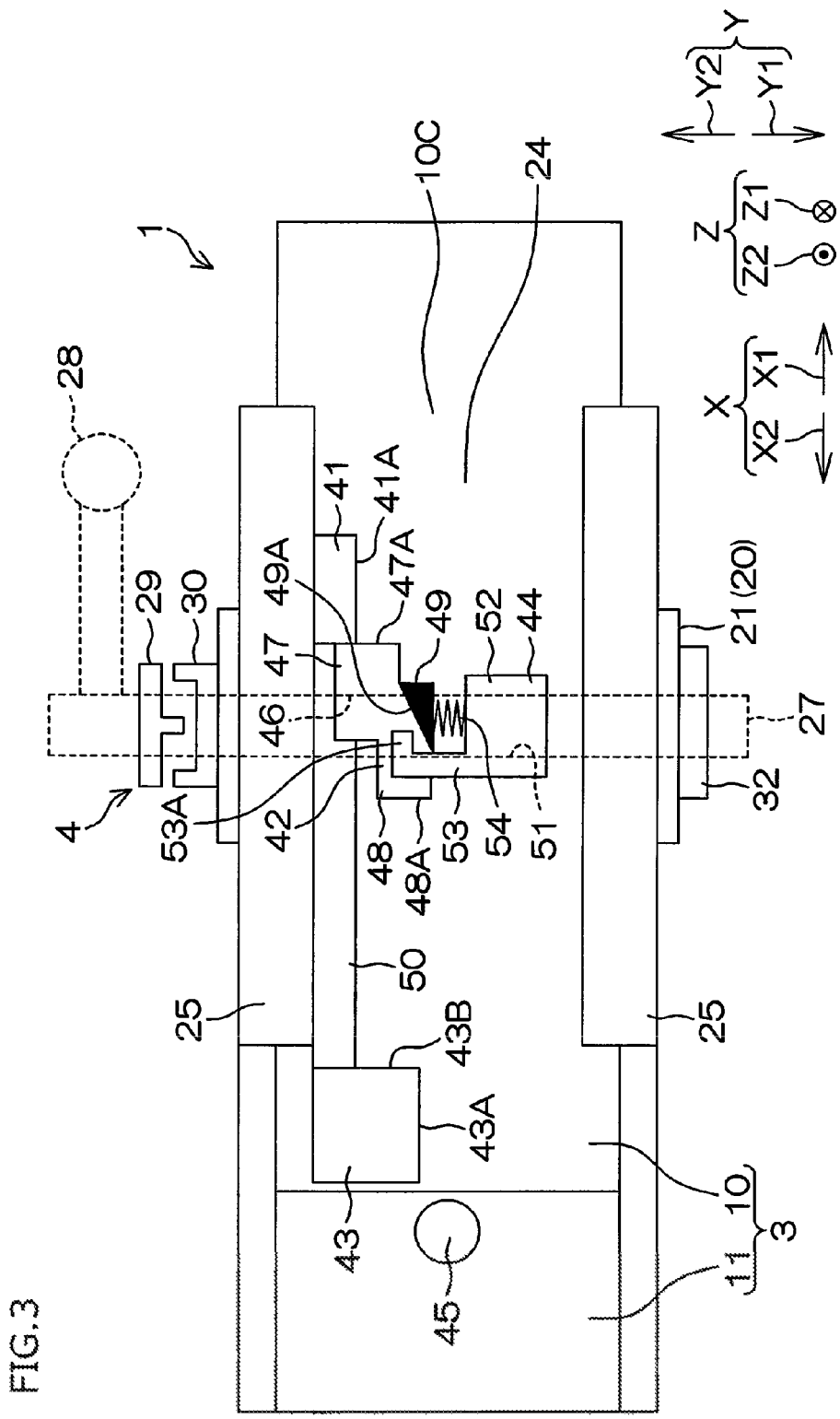
FIG. 3 is a bottom view of a main part of the steering system in FIG. 1, depicting a second stopper member located at an advanced position.

FIG. 3 is a bottom view of a main part of the steering system 1 in FIG. 1. Now, a first stopper member 41, a second stopper member 42, a third stopper member 43, a conversion member 44, and a releasing mechanism 45 included in the steering system 1 will be described with reference to FIG. 3.

The first stopper member 41 is formed like a small piece that is generally rectangular (see FIG. 1) as viewed in the lateral direction Y and that is thin in the lateral direction Y. The first stopper member 41 is fixed to a lower area of an outer side surface 10C of the upper jacket 10 so as to protrude toward the lower side Z2.

The second stopper member 42 is shaped like a block with a circular through-hole 46 extending in the lateral direction Y. The rotating shaft 27 is inserted through the through-hole 46, and the second stopper member 42 is supported by the rotating shaft 27 so as to be movable in the lateral direction Y. The second stopper member 42 is supported by the bracket 20 on the vehicle body via the rotating shaft 27.

The second stopper member 42 integrally includes a first contact portion 47 forming a rear portion, a second contact portion 48 forming a front portion, and a transmission portion 49. A left end of the first contact portion 47 slightly protrudes toward the left side Y2 with respect to a left end of the second contact portion 48. A first contact surface 47A that is a rear end surface of the first contact portion 47 and a second contact surface 48A that is a front end surface of the second contact portion 48 are both flat surfaces extending along a direction perpendicular to the axial direction X. The transmission portion 49 is depicted as a filled-in portion in FIG. 3 for convenience of description, and in the second stopper member 42, protrudes outward in a radial direction around the rotating shaft 27. The transmission portion 49 has, as a left end surface thereof, an inclined surface 49A inclined toward the left side Y2 as the surface extends to the rear side X1.

The second stopper member 42 and a portion of the rotating shaft 27 that supports the second stopper member 42 are disposed in the slit 24 between the support portions 25 of the lower jacket 11 and positioned on the front side X2 with respect to the first stopper member 41. The second stopper member 42 depicted in FIG. 3 is located at an advanced position in the lateral direction Y. When the steering system 1 is in the unlocked state, the second stopper member 42 is in the advanced position. In the second stopper member 42 at the advanced position, the first contact surface 47A of the first contact portion 47 is located at the same position as that of the first stopper member 41 in the lateral direction Y and lies on the front side X2 with respect to the first stopper member 41 in the axial direction X so as to face the first stopper member 41.

The third stopper member 43 is shaped like a block that is generally rectangular (see FIG. 1) as viewed in the lateral direction Y and that is thicker than the first stopper member 41 in the lateral direction Y. The third stopper member 43 is fixed to a lower area of the outer side surface 10C of the upper jacket 10 on the front side X2 with respect to the first stopper member 41 so as to protrude toward the lower side Z2. A right end surface 43A of the third stopper member 43 is positioned on the right side Y1 with respect to a right end surface 41A of the first stopper member 41. A third contact surface 43B that is a rear end surface of the third stopper member 43 is a flat surface extending along a direction perpendicular to the axial direction X. The second stopper member 42 and a portion of the rotating shaft 27 that supports the second stopper member 42 are positioned on the rear side X1 with respect to the third stopper member 43.

In the second stopper member 42 at the advanced position, the first contact surface 47A of the first contact portion 47 lies on the front side X2 with respect to the first stopper member 41 so as to face the first stopper member 41 as described above, while the second contact surface 48A of the second contact portion 48 lies on the rear side X1 with respect to the third stopper member 43 in the axial direction X so as to face the third contact surface 43B of the third stopper member 43. In other words, the second stopper member 42 at the advanced position is sandwiched between the first stopper member 41 and the third stopper member 43 in the axial direction X.

Figure 6:
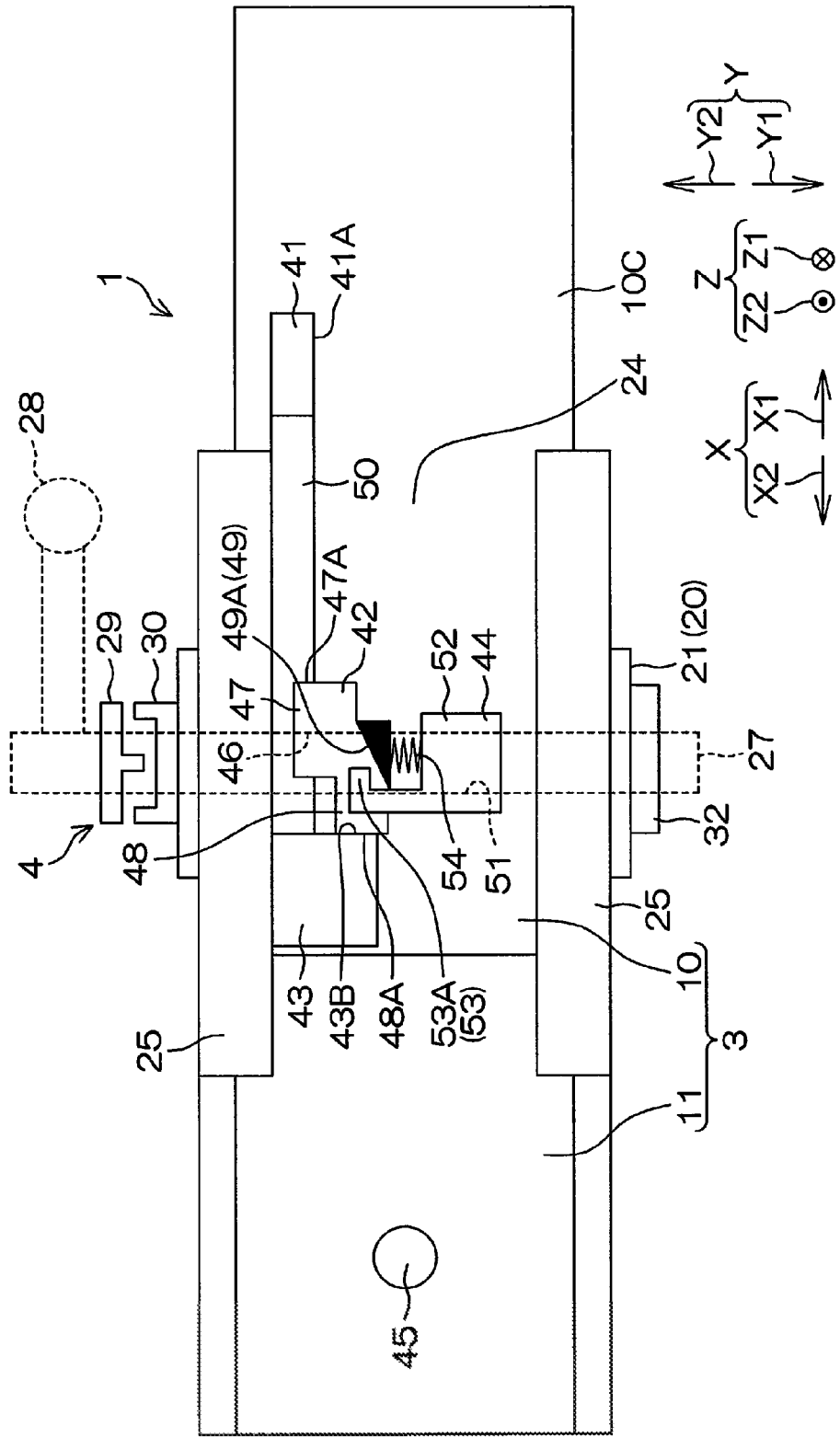
FIG. 6 is a bottom view of the main part of the steering system in FIG. 5, depicting the second stopper member located at the advanced position.

Thus, during the telescopic adjustment of the column jacket 3, when the steering member 5 is moved to an allowable stroke limit toward the front side or the rear side, the second stopper member 42 comes into contact, in the axial direction X, with the first stopper member 41 or the third stopper member 43, which moves along with the upper jacket 10. Specifically, when the steering member 5 is moved to the allowable stroke limit toward the front side X2, the upper jacket 10 reaches the short position in FIG. 3, and the first stopper member 41 comes into contact with the first contact surface 47A of the second stopper member 42 from the rear side X1 in the axial direction X. In contrast, when the steering member 5 is moved to the allowable stroke limit toward the rear side X1, the upper jacket 10 reaches the long position in FIG. 5 and FIG. 6, and the third contact surface 43B of the third stopper member 43 comes into contact with the second contact surface 48A of the second stopper member 42 from the front side X2 in the axial direction X.

When the second stopper member 42 comes into contact with the first stopper member 41 or the third stopper member 43, movement of the upper jacket 10 is restricted so that the distance the upper jacket 10 moves does not exceed a predetermined distance during the telescopic adjustment of the column jacket 3. Specifically, the moving distance (what is called a telescopic stroke) of the upper jacket 10 is restricted to within a predetermined range corresponding to the distance between the first stopper member 41 and the third stopper member 43. Thus, the column jacket 3 can be extended and contracted within the predetermined range.

The first stopper member 41 and the third stopper member 43 may be separately present or may be integrated together by being coupled together via a plate-like coupling member 50 extending in the axial direction X. The first stopper member 41, the second stopper member 42, and the third stopper member 43 are each preferably made of metal due to the need for sufficient strength to withstand the contact.

As seen in FIG. 3, the conversion member 44 integrally has a body portion 52 shaped like a block with a circular through-hole 51 extending in the lateral direction Y and a transmission portion 53 protruding toward the left side Y2 from to the body portion 52. The rotating shaft 27 is inserted through the through-hole 51, and the conversion member 44 is supported by the rotating shaft 27 so as to be rotatable integrally with the rotating shaft 27. The conversion member 44 is disposed in the slit 24 between the support portions 25 of the lower jacket 11 on the right side Y1 of the second stopper member 42. The transmission portion 53 as a whole does not overlap the through-hole 51 as viewed in the lateral direction Y. The transmission portion 53 has, as its distal end, a distal end portion 53A bent toward the through-hole 51. The distal end portion 53A lies on the left side Y2 with respect to the inclined surface 49A of the transmission portion 49 of the second stopper member 42 so as to face the inclined surface 49A.

A biasing member 54 formed of a coil spring is interposed between the body portion 52 and the second stopper member 42 so as to be compressed in the lateral direction Y. The second stopper member 42 is constantly biased toward the advanced position on the left side Y2 by the biasing force of the biasing member 54.

In a state in FIG. 3, when the operation member 28 is operated as described above to change the steering system 1 from the unlocked state to the locked state, the conversion member 44 rotates integrally with the rotating shaft 27 in conjunction with the operation of the operation member 28. At this time, the distal end portion 53A of the transmission portion 53 of the conversion member 44 comes into contact with the inclined surface 49A of the transmission portion 49 of the second stopper member 42 along a rotating direction of the rotating shaft 27. The second stopper member 42 is then pressed toward the right side Y1 by the distal end portion 53A according to the inclination of the inclined surface 49A, to move toward the right side Y1. In other words, the conversion member 44 converts rotation of the rotating shaft 27 into movement of the second stopper member 42 in the lateral direction Y.

Figure 4:
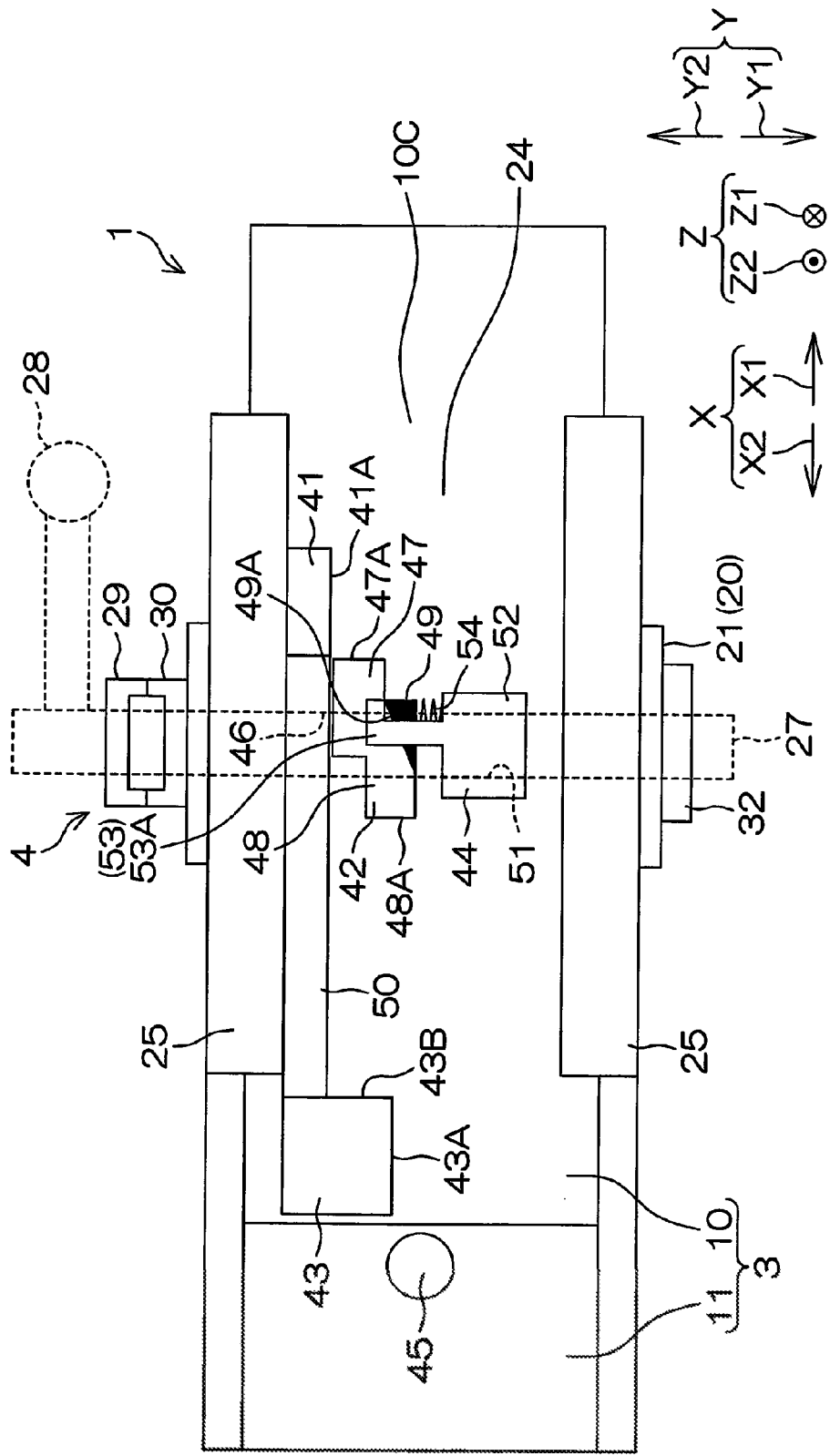
FIG. 4 is a bottom view of the main part of the steering system, corresponding to FIG. 3 and depicting the second stopper member located at a retracted position.
Figure 7:
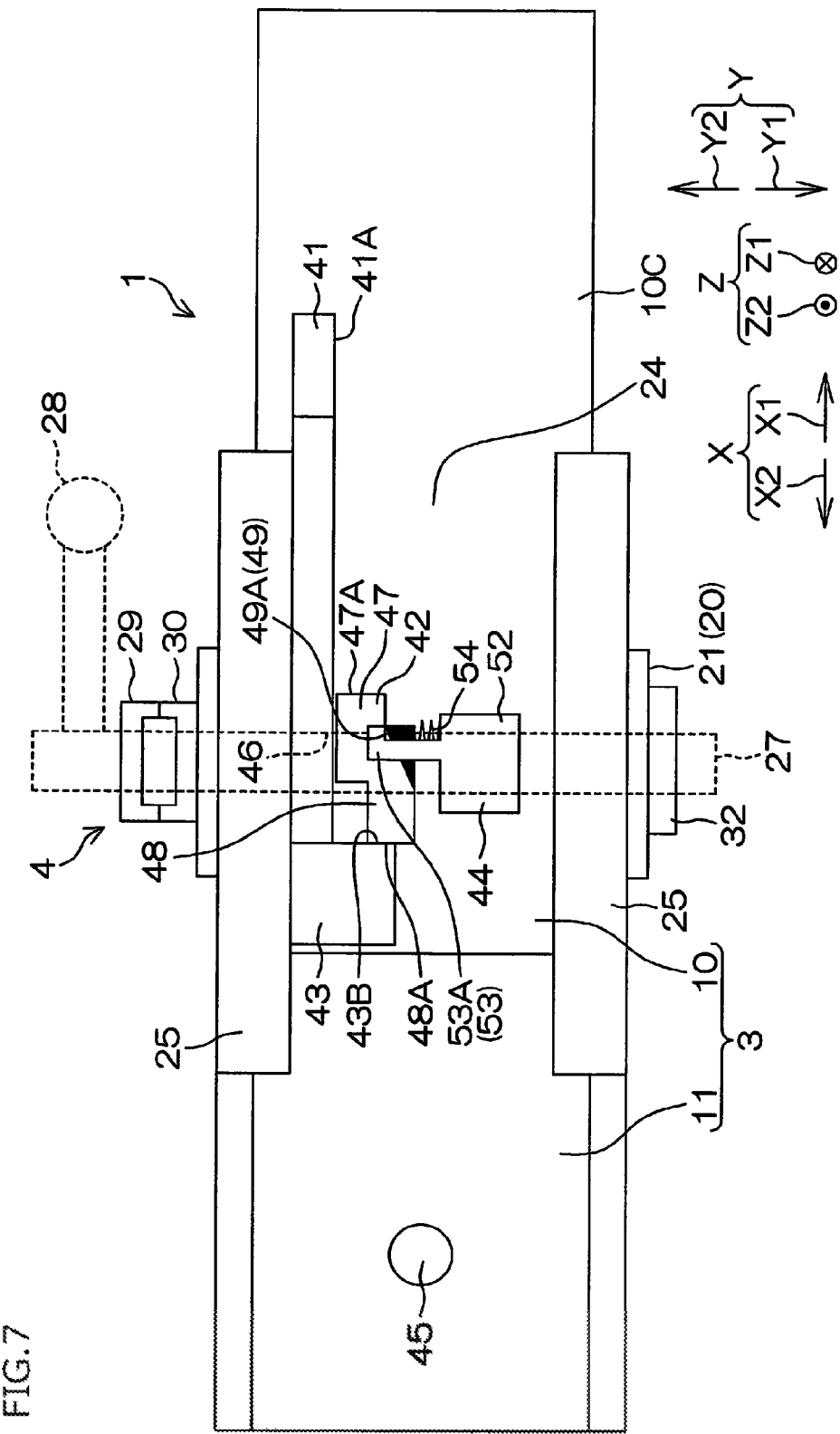
FIG. 7 is a bottom view of the main part of the steering system, corresponding to FIG. 6 and depicting the second stopper member located at the retracted position.

FIG. 4 depicts the second stopper member 42 moved to the allowable stroke limit toward the right side Y1. In FIG. 4, the steering system 1 is in the locked state, and the second stopper member 42 is located at a retracted position as a result of retraction from the advanced position toward the right side Y1. The second stopper member 42 at the retracted position is completely displaced from the first stopper member 41 toward the right side Y1 and thus does not face the first stopper member 41 in the axial direction X. On the other hand, the third contact surface 43B of the third stopper member 43 is wide in the lateral direction Y. Thus, the third contact surface 43B still lies on the front side X2, which is on the opposite side from the first stopper member 41 in the axial direction X, with respect to the second contact surface 48A of the second contact portion 48 of the second stopper member 42 at the retracted position so as to face the second contact surface 48A. This applies to both of a case where the upper jacket 10 is located at the short position (see FIG. 4) and a case where the upper jacket 10 is located at the long position (see FIG. 7).

When the operation member 28 is operated in the opposite direction to rotate the rotating shaft 27 in the opposite direction, the distal end portion 53A of the transmission portion 53 of the conversion member 44 exerts a weaker pressing force acting toward the right side Y1 on the inclined surface 49A of the transmission portion 49 of the second stopper member 42. Thus, under the biasing force of the biasing member 54, the second stopper member 42 moves to the advanced position on the left side Y2 depicted in FIG. 3. When the second stopper member 42 moves to the advanced position, the steering system 1 is brought into the unlocked state.

As described above, the second stopper member 42 can move between the advanced position and the retracted position in the lateral direction Y. When the operation member 28 is operated to rotate the rotating shaft 27, the second stopper member 42 can be moved to the advanced position and to the retracted position in the lateral direction Y. Furthermore, as depicted in FIG. 3, when the lock and unlock mechanism 4 unlocks the upper jacket 10, the second stopper member 42 moves to the advanced position in conjunction with the operation of the operation member 28. In contrast, as depicted in FIG. 4, when the lock and unlock mechanism 4 locks the upper jacket 10, the second stopper member 42 moves to the retracted position in conjunction with the operation of the operation member 28.

In connection with the releasing mechanism 45, in the lower jacket 11, an insertion hole 60 is formed at such a position that the insertion hole 60 is located on the front side X2 with respect to and adjacent to a front end 10D of the upper jacket 10 that is at the short position as depicted in FIG. 1. The insertion hole 60 is a through-hole formed at one position on a periphery of the lower jacket 11.

The releasing mechanism 45 is a pin formed of a material such as resin which can be sheared. The releasing mechanism 45 is inserted through the insertion hole 60 so as to be fixed to the lower jacket 11. A distal end portion 45A of the releasing mechanism 45 projects to the inside of the lower jacket 11 from the insertion hole 60 and lies on the front side X2 with respect to the front end 10D of the upper jacket 10 so as to face the front end 10D.

Now, motions made in the steering system 1 at the time of a vehicular collision will be described. At the time of a vehicular collision, what is called a secondary collision may occur in which the driver collides against the steering member 5 from the rear side X1.

When the steering system 1 is in the locked state, impact resulting from the secondary collision is transmitted to the upper jacket 10 via the steering member 5 and the upper shaft 8. Thus, the upper jacket 10 moves toward the front side X2 along with the steering member 5 and the upper shaft 8 while sliding on an inner peripheral surface of the lower jacket 11. Consequently, the column jacket 3 is contracted in the axial direction X.

Figure 8:
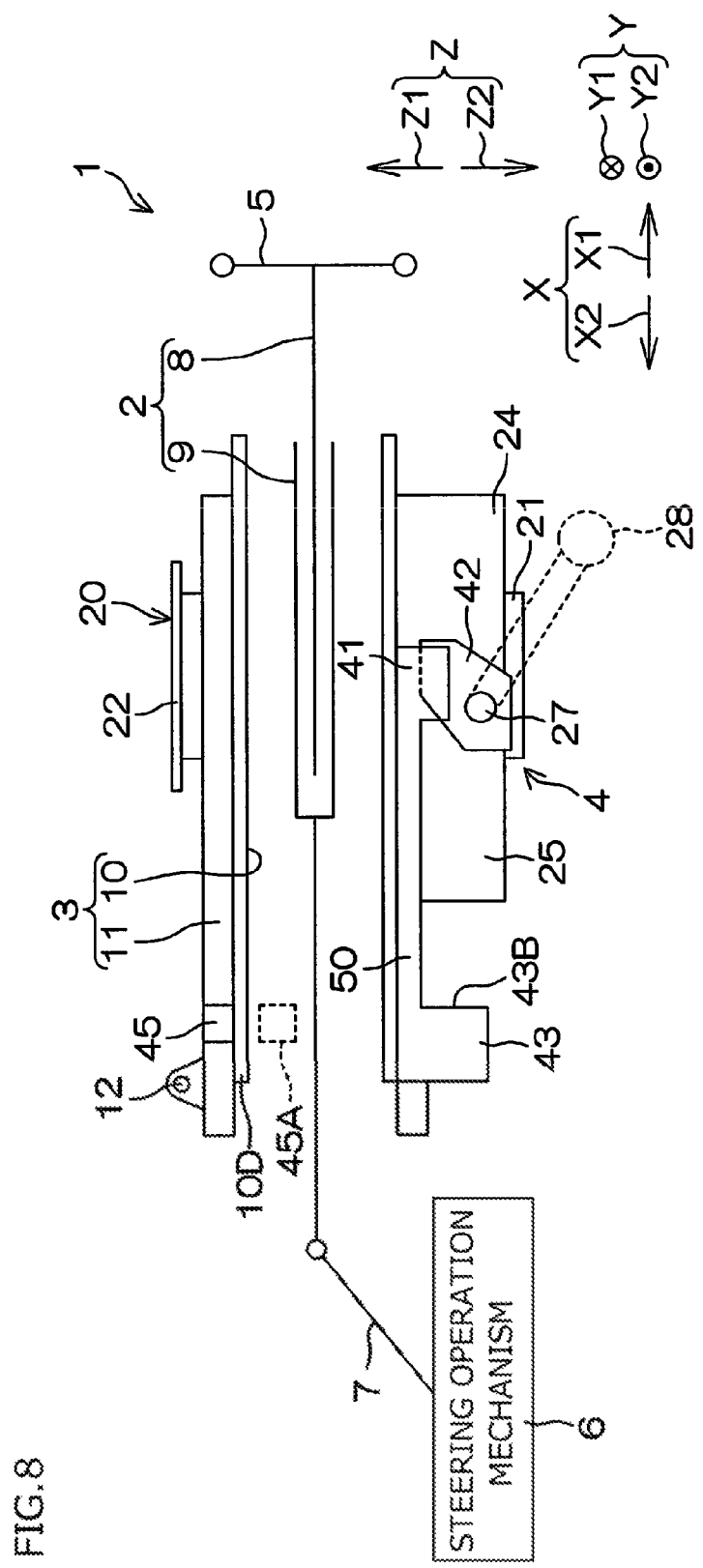
FIG. 8 is a diagram corresponding to FIG. 1 and depicting a released upper jacket.
Figure 9:
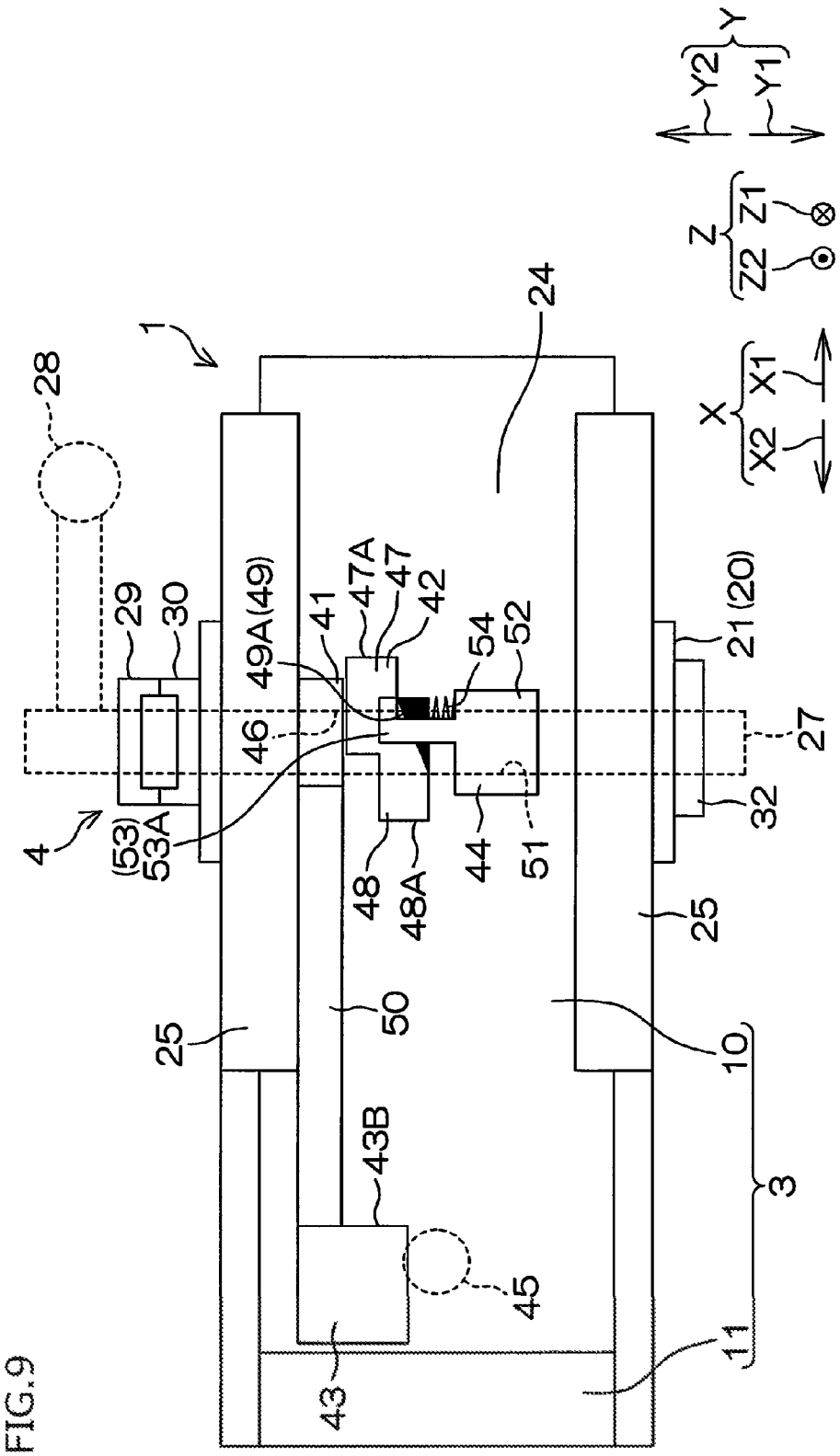
FIG. 9 is a bottom view of the important part of the steering system in FIG. 8.

In conjunction with the movement of the upper jacket 10, the front end 10D of the upper jacket 10 collides against the distal end portion 45A of the releasing mechanism 45 from the rear side X1. The releasing mechanism 45 is sheared such that, for example, the shearing starts at a point on the distal end portion 45A against which the upper jacket 10 has collided as depicted in FIG. 8. The sheared distal end portion 45A falls inside the upper jacket 10 as a broken piece. The shearing of the releasing mechanism 45 allows the upper jacket 10 to be released from the releasing mechanism 45 toward the front side X2. The upper jacket 10 then further moves forward as depicted in FIG. 8 and FIG. 9. Subsequently, the impact resulting from the secondary collision is absorbed by the sliding of the upper jacket 10 on the lower jacket 11 and the shearing of the releasing mechanism 45 until the movement of the upper jacket 10 is stopped.

Thus, the releasing mechanism 45 has only a function to be sheared at the time of a vehicular collision, and unlike the first to third stopper members 41 to 43, and does not have function to restrict the movement of the upper jacket 10 during the telescopic adjustment.

In contrast, the releasing mechanism 45 is assumed to have all of these functions, for example, the releasing mechanism 45 is assumed to be able to also function as the first stopper member 41 or the third stopper member 43. In this case, to withstand a load (contact load) imposed when the second stopper member 42 comes into contact with the first stopper member 41 or the third stopper member 43, the releasing mechanism 45 needs to be made robust. Accordingly, a load (releasing load) needed to release the upper jacket 10 at the time of a vehicular collision is inevitably increased by an amount equal to the increase in robustness. This makes adjustment of the releasing load to any small value difficult. However, if the releasing mechanism 45 is not made robust, the releasing mechanism 45 may be sheared before a vehicular collision when the second stopper member 42 comes into contact with the releasing mechanism 45 during the normal telescopic adjustment.

However, in the steering system 1, the function to be sheared at the time of a vehicular collision is assigned only to the releasing mechanism 45, while the function to restrict the movement of the upper jacket 10 during the telescopic adjustment is shared among the first to third stopper members 41 to 43. Thus, the releasing mechanism 45 may have a strength needed to be sheared at the time of a vehicular collision regardless of the contact load, and thus, the releasing load can be optionally adjusted by changing the thickness, the material, or the like of the releasing mechanism 45. For the first to third stopper members 41 to 43 as well, the material, the dimensions, and the like can be optionally changed regardless of the releasing load, so as to produce the desired contact load.

At the time of a vehicular collision, the second stopper member 42 is located at the retracted position and does not face the first stopper member 41 in the axial direction X. Therefore, at the time of a vehicular collision, the second stopper member 42 does not come into contact with the first stopper member 41 in the axial direction X. This allows the upper jacket 10 having the first stopper member 41 to be smoothly released. Therefore, the release of the upper jacket 10 at the time of a vehicular collision is not hindered by first stopper member 41 and the second stopper member 42 that restrict the movement of the upper jacket 10 so that the distance the upper jacket moves does not exceed the predetermined distance.

On the other hand, the third stopper member 43 faces the second contact surface 48A of the second contact portion 48 of the second stopper member 42 at the retracted position. Thus, after the vehicular collision, when the upper jacket 10 is moved toward the rear side X1, corresponding to a direction opposite to the direction in which the upper jacket 10 is released, the third stopper member 43 comes into contact with the second stopper member 42 during the operation. Thus, further movement of the upper jacket 10 in the opposite direction can be restricted, which allows the upper jacket 10 to be prevented from coming off from the lower jacket 11 after the vehicular collision.

The present invention is not limited to the above-described embodiment but various changes may be made to the embodiment.

For example, if, at the time of a vehicular collision, the operation member 28 is inadvertently moved to move the second stopper member 42 to the advanced position as depicted in FIG. 3, the first stopper member 41 comes into contact with the second stopper member 42 before the releasing mechanism 45 is sheared. At this time, the first stopper member 41 may be deformed to impose the above-described releasing load.

When the steering system 1 is brought to the unlocked state while the upper jacket 10 is located at the short position, the second stopper member 42 is expected to normally move to the advanced position to come into contact with the first stopper member 41 from the front side X2. However, the releasing mechanism 45 may function instead of the second stopper member 42 to come into contact with the upper jacket 10 from the front side X2 as depicted in FIG. 4 if perchance the second stopper member 42 fails to move to the advanced position. In this case, the upper jacket 10 is already located at the short position, and thus, a force applied to the releasing mechanism 45 by the upper jacket 10 is weaker than a force applied to the releasing mechanism 45 in a case where the upper jacket 10 collides against the releasing mechanism 45 at a speed at which the upper jacket 10 moves from the long position to the short position. Thus, the releasing mechanism 45 may have a low strength enough to be sheared at the time of a vehicular collision as described above.

The shape and the material of each of the first stopper member 41, the second stopper member 42, and the third stopper member 43 may be optionally changed to the extent that the stopper member can accomplish the above-described function.

Figure 10:
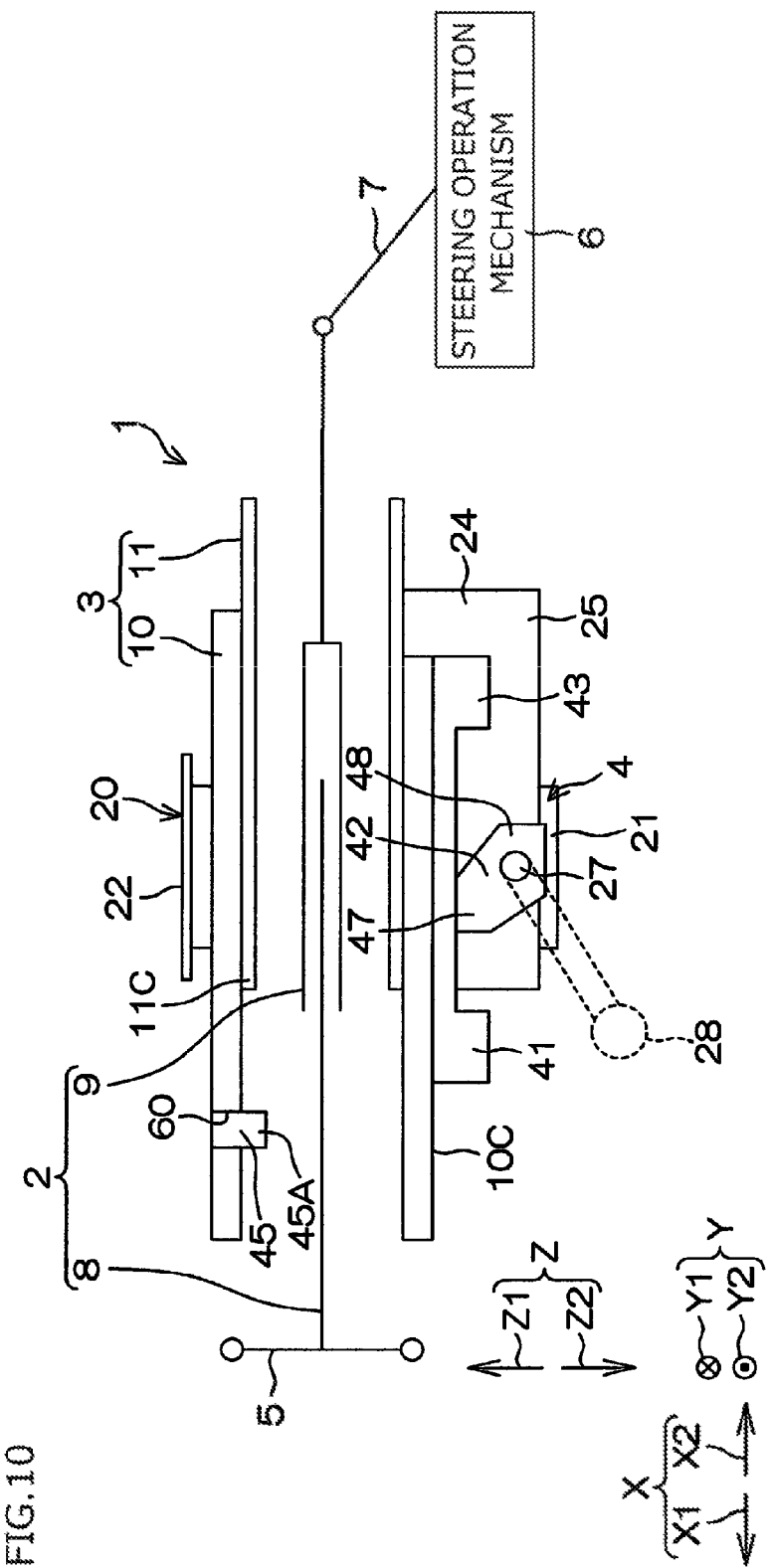
FIG. 10 is a schematic diagram of a steering system according to a first variation.
Figure 11:
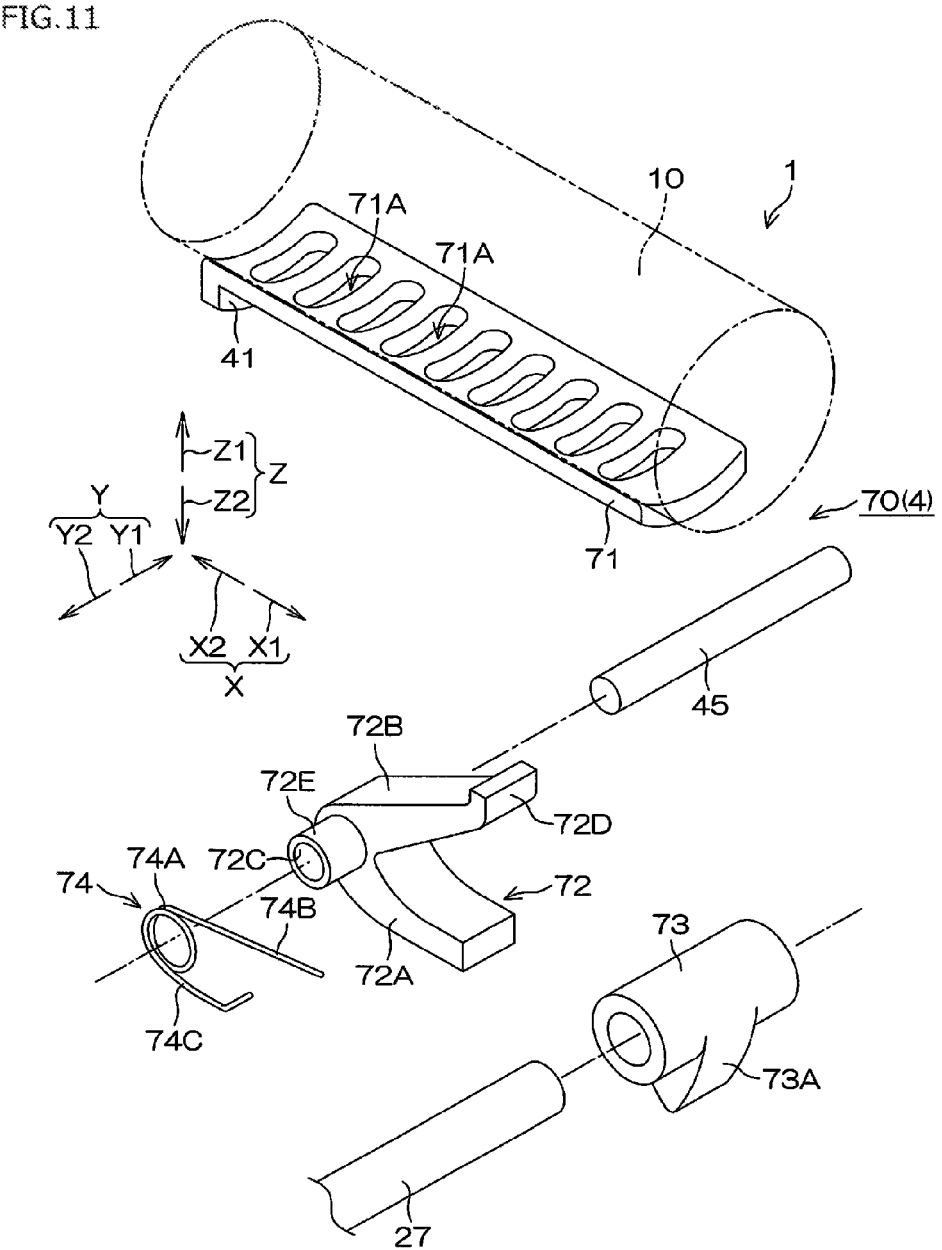
FIG. 11 is an exploded perspective view of a main part of a steering system according to a second variation.
Figure 12:
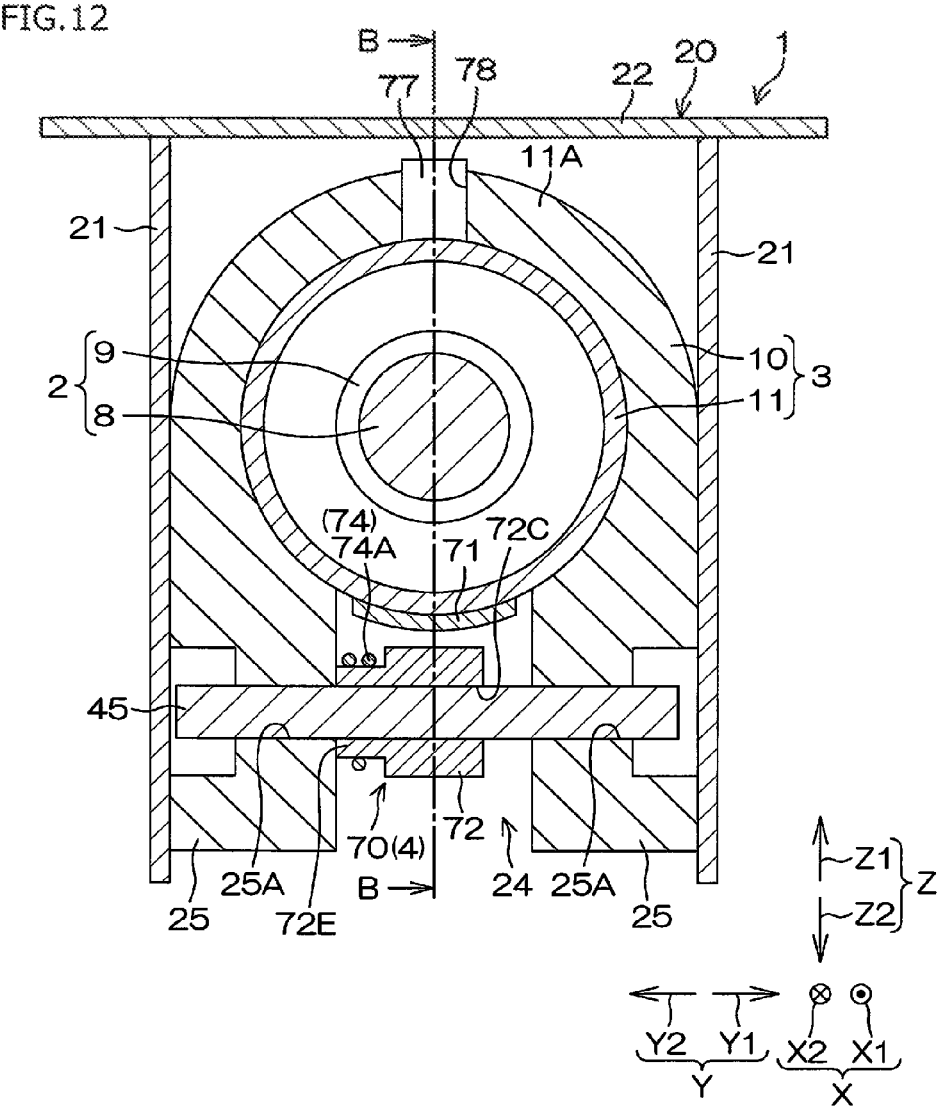
FIG. 12 is a sectional view of the main part of the steering system according to the second variation.

In the above-described embodiment, the lower jacket 11 houses the upper jacket 10 (see FIG. 1). However, the steering system 1 in a first variation depicted in FIG. 10 may have a reverse configuration in which the upper jacket 10 houses the lower jacket 11. In the first variation, the releasing mechanism 45 is inserted through the insertion hole 60 formed in the upper jacket 10 on the rear side X1 with respect to the lower jacket 11. The distal end portion 45A of the releasing mechanism 45 lies on the rear side X1 with respect to a rear end 11C of the lower jacket 11 so as to face the rear end 11C. The upper jacket 10 in the first variation has the above-described pair of support portions 25. The through-hole 26 (see FIG. 2) in each of the support portions 25 through which the rotating shaft 27 is inserted is elongate in the axial direction X so as to allow the upper jacket 10 to be moved in the axial direction X.

In the steering system 1 in the first variation, the configuration other than that described above is substantially the same as that in the above-described embodiment. Thus, in the first variation as well, in the first stopper member 41 and the third stopper member 43 fixed to the outer side surface 10C of the upper jacket 10, the first stopper member 41 is positioned on the rear side X1 with respect to the third stopper member 43. Furthermore, in the first variation as well, in the second stopper member 42, the first contact portion 47 is positioned on the rear side X1 with respect to the second contact portion 48. Positions of the first stopper member 41, the second stopper member 42, the third stopper member 43, and the conversion member 44 may be adjusted as needed so that the members function normally.

When the steering system 1 in the first variation is in the unlocked state, the second stopper member 42 is located at the above-described advanced position. In the second stopper member 42, the first contact portion 47 lies on the front side X2 with respect to the first stopper member 41 so as to face the first stopper member 41, while the second contact portion 48 lies on the rear side X1 with respect to the third stopper member 43 so as to face the third stopper member 43. Thus, the telescopic stroke is restricted to within a predetermined range corresponding to the distance between the first stopper member 41 and the third stopper member 43.

On the other hand, when the steering system 1 in the first variation is in the locked state, the second stopper member 42 is located at the above-described retracted position, and does not face the first stopper member 41 in the axial direction X. However, the third stopper member 43 lies on the front side X2, which is on the opposite side from the first stopper member 41 in the axial direction X, with respect to the second contact portion 48 of the second stopper member 42 at the retracted position so as to face the second contact portion 48.

In this state, when a vehicular collision occurs, impact resulting from a secondary collision is transmitted to the upper jacket 10 via the steering member 5 and the upper shaft 8. Thus, the upper jacket 10 moves toward the front side X2 along with the steering member 5 and the upper shaft 8 while sliding on an outer peripheral surface of the lower jacket 11. Consequently, the column jacket 3 is contracted in the axial direction X, and the releasing mechanism 45 of the upper jacket 10 approaches the rear end 11C of the lower jacket 11 from the rear side X1. When the distal end portion 45A of the releasing mechanism 45 collides against the rear end 11C of the lower jacket 11, the releasing mechanism 45 is sheared such that, for example, the shearing starts at a point on the distal end portion 45A against which the upper jacket 10 has collided. Thus, the upper jacket 10 is released toward the front side X2 and further moves forward. Subsequently, the impact resulting from the secondary collision is absorbed by the sliding of the upper jacket 10 on the lower jacket 11 and the shearing of the releasing mechanism 45 until the movement of the upper jacket 10 is stopped.

In the first variation as well, at the time of a vehicular collision, the second stopper member 42 is located at the retracted position and does not face the first stopper member 41 in the axial direction X. Therefore, at the time of a vehicular collision, the second stopper member 42 does not come into contact with the first stopper member 41 in the axial direction X. This allows the upper jacket 10 to be smoothly released. Therefore, the release of the upper jacket 10 at the time of a vehicular collision is not hindered by first stopper member 41 and the second stopper member 42 that restrict the movement of the upper jacket 10 during the telescopic adjustment of the column jacket 3.

Figure 13:
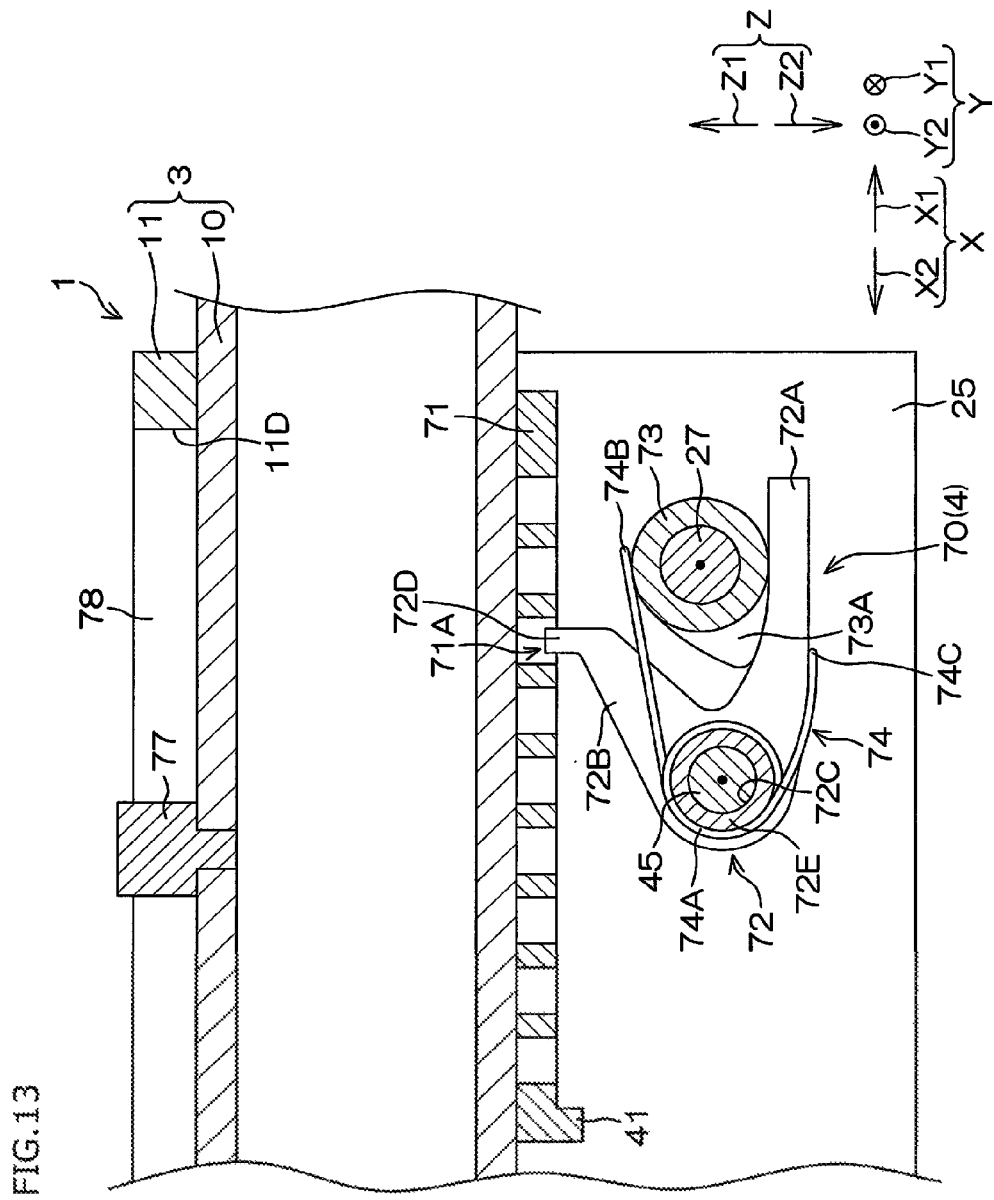
FIG. 13 is a sectional view taken along line B-B in FIG. 12.
Figure 14:
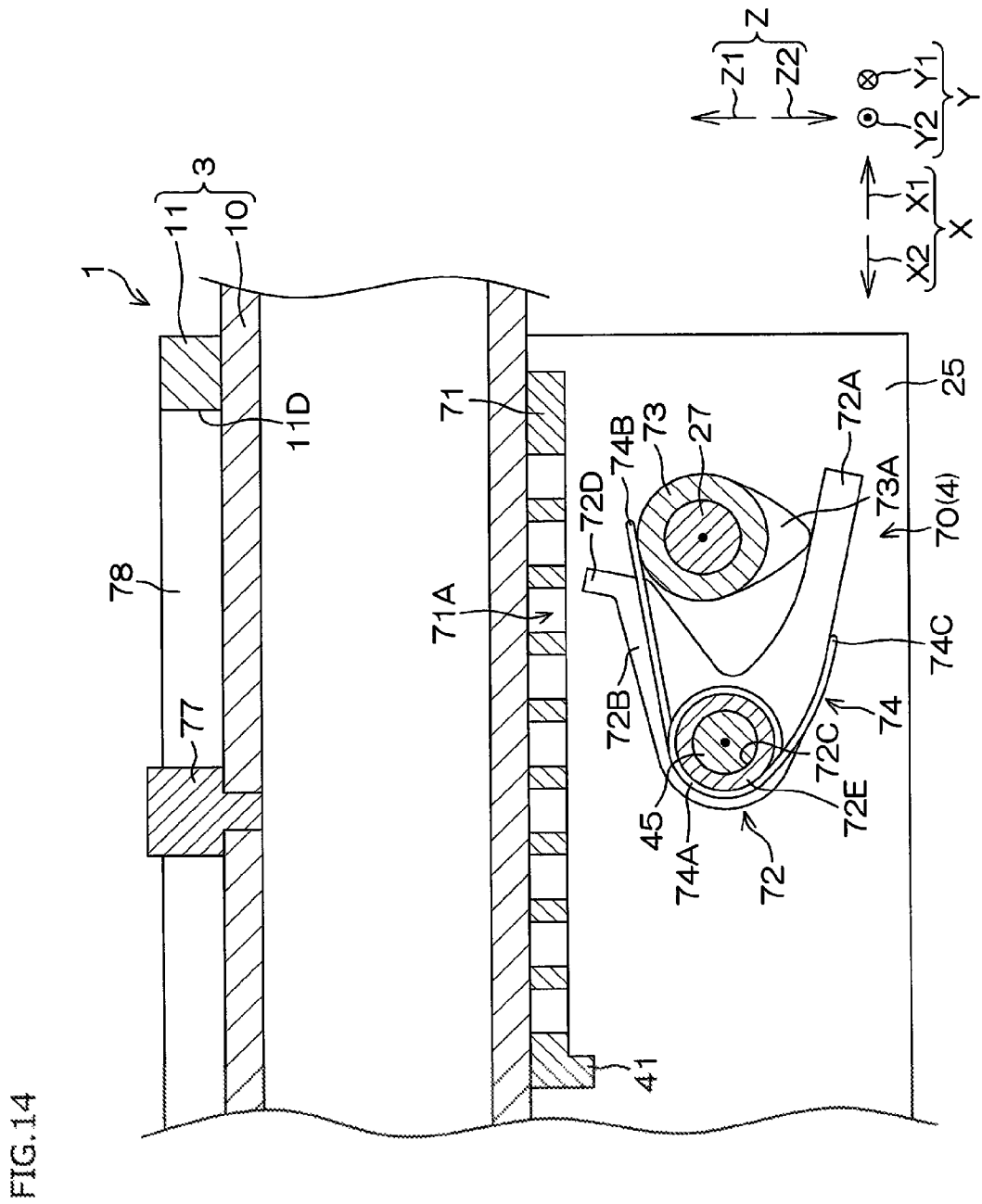
FIG. 14 is a diagram depicting a portion of the steering system in an unlocked state that corresponds to FIG. 13.

With reference to FIGS. 11 to 16, a second variation will be described. In FIGS. 11 to 16, the same members as those of the embodiment described with reference to FIGS. 1 to 9 are denoted by the same reference numerals, and description of these members are omitted. In FIG. 13 and FIG. 14, illustration of the steering shaft 2 is omitted.

The steering system 1 according to the second variation is the same as the steering system 1 in FIGS. 1 to 9 in basic configuration but is different from the steering system 1 in FIGS. 1 to 9 in details. Specifically, referring to FIG. 11, the steering system 1 according to the second variation includes a lock mechanism 70 that firmly locks the upper jacket 10 so that the upper jacket 10 does not to move in the axial direction X in the locked state. The lock mechanism 70 is included in the lock and unlock mechanism 4. The lock mechanism 70 includes a first engagement portion 71, a second engagement portion 72, a cam member 73, a biasing member 74, and the above-described rotating shaft 27 and releasing mechanism 45.

The first engagement portion 71 is shaped like a plate that is thin in the up-down direction Z and elongate in the axial direction X, and is fixed to the lower area of the outer side surface 10C of the upper jacket 10 by welding or the like. A plurality of holes 71A that is elongate in the lateral direction Y is formed in the first engagement portion 71 such that the holes 71A are arranged at substantially regular intervals in the axial direction X. A front end of the first engagement portion 71 is folded toward the lower side Z2 and functions as the above-described first stopper member 41.

The second engagement portion 72 integrally includes a lower portion 72A extending toward the rear side X1 and an upper portion 72B extending rearward from a front end of the lower portion 72A so as to incline upward. An insertion hole 72C is formed in a portion where the lower portion 72A and the upper portion 72B that are coupled together, so as to penetrate the portion in the lateral direction Y. The releasing mechanism 45 is inserted through the insertion hole 72C so as to extend in the lateral direction Y and passed between the support portions 25 of the lower jacket 11 at a position on the front side X2 with respect to the rotating shaft 27 (see FIGS. 12 and 13). The support portion 25 each have an insertion hole 25A through which the rotating shaft 27 is inserted (see FIG. 12). The second engagement portion 72 is coupled to the lower jacket 11 via the releasing mechanism 45 and can be tilted up and down around the releasing mechanism 45. A pawl 72D folded toward the upper side Z1 is provided integrally with a rear end of the upper portion 72B.

The cam member 73 is shaped generally like a cylinder externally fitted over the rotating shaft 27. A protruding portion 73A is provided at one position on a periphery of the cam member 73. The cam member 73 is fixed to the rotating shaft 27 and can rotate integrally with the rotating shaft 27 in conjunction with the operation of the operation member 28.

The biasing member 74 is a spring formed by, for example, bending wire. The biasing member 74 integrally includes a coil portion 74A fitted over a boss portion 72E protruding in the lateral direction Y and surrounding the insertion hole 72C in the second engagement portion 72, an upper extension portion 74B extending from the coil portion 74A toward the rear side X1 and caught on the cam member 73 from the upper side Z1, and a lower extension portion 74C extending from the coil portion 74A toward the rear side X1 and caught on the lower portion 72A from the lower side Z2 (see also FIG. 13). The biasing member 74 biases the second engagement portion 72 as a whole toward the upper side Z1 so as to move the pawl 72D of the second engagement portion 72 toward the upper side Z1.

As depicted in FIG. 13, when the steering system 1 is in the locked state and the operation member 28 is located at the locked position, the protruding portion 73A of the cam member 73 faces the front side X2, and the pawl 72D of the second engagement portion 72 is fitted into any one of the holes 71A in the first engagement portion 71 from the lower side Z2. Thus, the first engagement portion 71 and the second engagement portion 72 are engaged with each other. Consequently, the upper jacket 10 with the first engagement portion 71 fixed thereto is locked in the axial direction X and precluded from moving in the axial direction X.

When the operation member 28 at the locked position is operated and tilted to the unlocked position, the protruding portion 73A of the cam member 73 is directed toward the lower side Z2 to push the lower portion 72A of the second engagement portion 72 toward the lower side Z2 as depicted in FIG. 14. Thus, the second engagement portion 72 is tilted toward the lower side Z2 against the biasing force of the biasing member 74. Consequently, the pawl 72D of the second engagement portion 72 comes out from the hole 71A in which the pawl 72D has been fitted. In other words, the first engagement portion 71 and the second engagement portion 72 are disengaged from each other. This brings the steering system 1 to the unlocked state, and thus enables the telescopic adjustment or the tilt adjustment.

As depicted in FIG. 15, the operation member 28 is formed by folding a metal plate by pressing or the like. During pressing, the second stopper member 42 is formed integrally with the operation member 28. Specifically, on the operation member 28, a band-like extension portion 75 is formed which continuously extends from the operation member 28 toward the front side X2 while being folded at a number of points. A distal end portion 75A of the extension portion 75 that is located away from the operation member 28 serves as the second stopper member 42 according to the second variation. The second stopper member 42 is formed like a small piece extending in the lateral direction Y. To enhance the strength of the second stopper member 42, the second stopper member 42 may be configured by, for example, folding the distal end portion 45A to form two layers. The second stopper member 42 may be a component that is separate from the operation member 28 and that is fixed to the operation member 28 by welding, with screws, or the like.

As described above, in the second variation, the second stopper member 42 is provided directly on the operation member 28. The second stopper member 42 is supported by the lower jacket 11 on the vehicle body via the operation member 28 and the rotating shaft 27. In this case, when the operation member 28 is operated and tilted between the locked position and the unlocked position, the second stopper member 42 moves integrally with the operated operation member 28 to the above-described advanced position or to the above-described retracted position.

Specifically, in FIG. 15, the steering system 1 is in the unlocked state, and the operation member 28 is located at the unlocked position. In this state, the second stopper member 42 is located at the advanced position, and lies on the front side X2 with respect to the support portions 25 of the lower jacket 11 so as to move forward from the lower side Z2 into the slit 24 of the lower jacket 11. The second stopper member 42 at the advanced position lies on the front side X2 with respect to the first stopper member 41 of the front end of the first engagement portion 71 in the axial direction X so as to face the first stopper 41. Thus, when the upper jacket 10 is advanced to the short position by the telescopic adjustment, the first stopper member 41 comes into contact with the second stopper member 42 from the rear side X1. Consequently, further forward movement of the upper jacket 10 is restricted.

A reinforcement portion 76 protruding toward the lower side Z2 is integrally provided at a position on the lower jacket 11 that is located on the front side X2 with respect to and adjacent to the second stopper member 42 at the advanced position. The reinforcement portion 76 is a part of a peripheral portion of the slit 24 in the lower jacket 11. The reinforcement portion 76 positioned on the front side X2 with respect to the second stopper member 42 at the advanced position reinforces the second stopper member 42 by supporting the second stopper member 42 from the front side X2. Thus, the second stopper member 42 can be prevented from being broken by impact made when the first stopper member 41 comes into contact with the second stopper member 42 (hereinafter referred to as the impact resulting from the telescopic adjustment).

When the operation member 28 at the unlocked position is operated and placed at the locked position, the second stopper member 42 moves from the advanced position to the retracted position, located on the lower side Z2 of and away from the advanced position, in conjunction with tilting of the operation member 28, as depicted in FIG. 16. When the second stopper member 42 is located at the retracted position, the steering system 1 is in the locked state. The second stopper member 42 at the retracted position is located on the lower side Z2 of and away from the slit 24 and does not lie on the front side X2 with respect to the first stopper member 41 so as to face the first stopper member 41.

When the operation member 28 at the locked position is operated and placed at the unlocked position to bring the steering system 1 to the unlocked state, the second stopper member 42 moves from the current retracted position to the advanced position in conjunction with the tilting of the operation member 28, as depicted in FIG. 15.

As described above, in the second variation as well, when the steering system 1 is brought to the unlocked state, the second stopper member 42 moves to the advanced position in conjunction with the operation of the operation member 28 (see FIG. 15). In contrast, when the steering system 1 is brought to the locked state, the second stopper member 42 moves to the retracted position in conjunction with the operation of the operation member 28 the locked position (see FIG. 16). In other words, the second stopper member 42 executes the stopper function to restrict the forward movement of the upper jacket 10 in the telescopic adjustment only when the operation member 28 is located at the unlocked position.

The second variation uses the simple configuration in which the second stopper member 42 is provided on the operation member 28 to allow the second stopper member 42 to move to the advanced position or to the retracted position in conjunction with the operation of the operation member 28.

As depicted in FIG. 14, for example, a protrusion 77 protruding toward the upper side Z1 is provided on an upper side of an outer periphery of the upper jacket 10. In an upper side of an outer periphery of the lower jacket 11, a guide groove 78 is formed which extends in the axial direction X to receive the protrusion 77. When the upper jacket 10 is moved backward to the long position by the telescopic adjustment, a peripheral portion 11D that defines a rear end of the guide groove 78 comes into contact with the protrusion 77 from the rear side X1. This restricts further backward movement of the upper jacket 10. Furthermore, the protrusion 77 is fitted into the guide groove 78, so that circumferential positions of the upper jacket 10 and the lower jacket 11 is prevented from being displaced. In other words, the protrusion 77 accomplishes not only the stopper function to restrict the backward movement of the upper jacket 10 during the telescopic adjustment but also a function to inhibit rotation of the upper jacket 10 and the lower jacket 11.

At the time of a vehicular collision, the above-described impact resulting from the secondary collision is transmitted from the rear side X1 to the upper jacket 10 via the steering member 5 and the upper shaft 8. Thus, the upper jacket 10 acts to move toward the front side X2. In this case, as depicted in FIG. 13, the steering system 1 is in the locked state, and the first engagement portion 71 and the second engagement portion 72 are engaged with each other as described above. Accordingly, the impact resulting from the secondary collision is transmitted to the second engagement portion 72, and the second engagement portion 72 also acts to move toward the front side X2. This causes a burden to be imposed on the releasing mechanism 45 inserted through the insertion hole 72C in the second engagement portion 72. Consequently, the releasing mechanism 45 is sheared such that the shearing starts at any point in a longitudinal direction (lateral direction Y) of the releasing mechanism 45.

The shearing of the releasing mechanism 45 uncouples the second engagement portion 72 from the lower jacket 11. Thus, the upper jacket 10 is released from the positional restriction in the axial direction X and released from the lower jacket 11 toward the front side X2. At this time, the second stopper member 42 at the retracted position does not hinder the movement of the upper jacket 10 because the second stopper member 42 lies away from the moving trajectory of the upper jacket 10 to be released. The impact resulting from the secondary collision is absorbed by the sliding of the upper jacket 10 on the lower jacket 11 and the shearing of the releasing mechanism 45 until the movement of the upper jacket 10 is stopped after the releasing.

In the second variation as well, the releasing mechanism 45 is assigned only with the releasing function to break at the time of a vehicular collision and to allow the upper jacket 10 to be released, and the stopper function is shared among the first stopper member 41, the second stopper member 42, the protrusion 77 of the upper jacket 10, and the peripheral portion 11D of the lower jacket 11. In other words, the releasing mechanism 45 does not provide both the releasing function and the stopper function. Thus, impact resulting from the telescopic adjustment is not transmitted to the releasing mechanism 45. Therefore, generation of the releasing load is not hindered at the time of a vehicular collision by breaking of the releasing mechanism 45 occurred during the normal telescopic adjustment before the vehicular collision.

Since the releasing mechanism 45 is not subjected to repeated impact resulting from the telescopic adjustment, it is possible to suppress degraded durability and to stably generate the releasing load. If the releasing mechanism 45 also provides the stopper function unlike in the present invention, in order to prevent the impact resulting from the telescopic adjustment from acting on the releasing mechanism 45, an impact absorbing member such as a damper absorbing the impact needs to be separately provided. However, the present invention eliminates the need for the impact absorbing member, and thus the number of components can be reduced.

It is not necessary to break the first stopper member 41 and the second stopper member 42 to produce the releasing load at the time of a vehicular collision. Thus, the strength of the first and second stopper members 41 and 42 can be enhanced sufficiently to withstand the impact resulting from the telescopic adjustment.

In a third variation, the lock mechanism 70 in the second variation may be omitted.

The steering system 1 is not limited to a manual steering system in which the steering of the steering member 5 is not assisted but may be a column-assist electric power steering system in which the steering of the steering member 5 is assisted by an electric motor.

What is claimed is:

1. A steering system comprising:
 a steering member;
 a steering shaft to which the steering member is coupled at one end of the steering shaft and which can extend and contract in an axial direction;
 a column jacket having an upper jacket that supports the steering shaft on a side near the steering member, and a lower jacket fixed to a vehicle body to support the steering shaft on the opposite side from the steering member in the axial direction, the column jacket being enabled to extend and contract in the axial direction along with the steering shaft by movement of the upper jacket in the axial direction;
 an operation member operated to perform extension and contraction adjustment on the column jacket;
 a lock and unlock mechanism that locks and unlocks the upper jacket in the axial direction in conjunction with an operation of the operation member;
 a releasing mechanism that releases the upper jacket toward the opposite side at a time of a vehicular collision;
 a first stopper member fixed to an outer side surface of the upper jacket;
 a second stopper member that is supported on the vehicle body, moves in conjunction with the operation of the operation member to an advanced position where the second stopper member faces the first stopper member in the axial direction when the lock and unlock mechanism unlocks the upper jacket, and that moves in conjunction with the operation of the operation member to a retracted position where the second stopper member is retracted from the advanced position when the lock and unlock mechanism locks the upper jacket; and
 a third stopper member that is fixed to the outer side surface of the upper jacket and located on the opposite side from the first stopper member in the axial direction so as to face the second stopper member in the axial direction when the second stopper member is at the retracted position.

2. The steering system according to claim 1, further comprising:
 a rotating shaft that extends in a direction crossing the axial direction and coupled to the operation member, supports the second stopper member so that the second stopper member is movable in the crossing direction between the advanced position and the retracted position, and that rotates in conjunction with the operation of the operation member; and a conversion member supported by the rotating shaft to convert rotation of the rotating shaft into movement of the second stopper member in the crossing direction.

3. The steering system according to claim 1, wherein the third stopper member is engageable with the second stopper member at the retracted position.

4. The steering system according to claim 1, wherein the operation member is supported by the lower jacket, and the second stopper member is provided on the operation member and moves integrally with the operation member to be operated, so that the second stopper member moves to the advanced position or to the retracted position.

5. A steering system comprising:
a steering member;
a steering shaft to which the steering member is coupled at one end of the steering shaft and which can extend and contract in an axial direction;
a column jacket having an upper jacket that supports the steering shaft on a side near the steering member, and a lower jacket fixed to a vehicle body to support the steering shaft on the opposite side from the steering member in the axial direction, the column jacket being enabled to extend and contract in the axial direction along with the steering shaft by movement of the upper jacket in the axial direction;
an operation member operated to perform extension and contraction adjustment on the column jacket;
a lock and unlock mechanism that locks and unlocks the upper jacket in the axial direction in conjunction with an operation of the operation member;
a releasing mechanism that releases the upper jacket toward the opposite side at a time of a vehicular collision;
a first stopper member fixed to an outer side surface of the upper jacket; and
a second stopper member that is supported on the vehicle body, moves in conjunction with the operation of the operation member to an advanced position where the second stopper member faces the first stopper member in the axial direction when the lock and unlock mechanism unlocks the upper jacket, and that moves in conjunction with the operation of the operation member to a retracted position where the second stopper member is retracted from the advanced position when the lock and unlock mechanism locks the upper jacket,
wherein the releasing mechanism is engageable by an end face of an inner one of the upper jacket and the lower jacket when the second stopper member is at the retracted position.

6. The steering system according to claim 5, further comprising:
a rotating shaft that extends in a direction crossing the axial direction and coupled to the operation member, supports the second stopper member so that the second stopper member is movable in the crossing direction between the advanced position and the retracted position, and that rotates in conjunction with the operation of the operation member; and
a conversion member supported by the rotating shaft to convert rotation of the rotating shaft into movement of the second stopper member in the crossing direction.

7. The steering system according to claim 5, further comprising:
a third stopper member that is fixed to the outer side surface of the upper jacket and located on the opposite side from the first stopper member in the axial direction so as to face the second stopper member at the retracted position.

8. The steering system according to claim 6, further comprising:
a third stopper member that is fixed to the outer side surface of the upper jacket and located on the opposite side from the first stopper member in the axial direction so as to face the second stopper member at the retracted position.

9. The steering system according to claim 5, wherein the operation member is supported by the lower jacket, and
the second stopper member is provided on the operation member and moves integrally with the operation member to be operated, so that the second stopper member moves to the advanced position or to the retracted position.

10. A steering system comprising:
a steering member;
a steering shaft to which the steering member is coupled at one end of the steering shaft and which can extend and contract in an axial direction;
a column jacket having an upper jacket that supports the steering shaft on a side near the steering member, and a lower jacket fixed to a vehicle body to support the steering shaft on the opposite side from the steering member in the axial direction, the column jacket being enabled to extend and contract in the axial direction along with the steering shaft by movement of the upper jacket in the axial direction;
an operation member operated to perform extension and contraction adjustment on the column jacket;
a lock and unlock mechanism that locks and unlocks the upper jacket in the axial direction in conjunction with an operation of the operation member;
a releasing mechanism that releases the upper jacket toward the opposite side at a time of a vehicular collision;
a first stopper member fixed to an outer side surface of the upper jacket;
a second stopper member that is supported on the vehicle body, moves in conjunction with the operation of the operation member to an advanced position where the second stopper member faces the first stopper member in the axial direction when the lock and unlock mechanism unlocks the upper jacket, and that moves in conjunction with the operation of the operation member to a retracted position where the second stopper member is retracted from the advanced position when the lock and unlock mechanism locks the upper jacket; and
a third stopper member that is fixed to the outer side surface of the upper jacket and located on the opposite side from the first stopper member in the axial direction so as to face the second stopper member at the retracted position, the third stopper member being engageable with the second stopper member at the retracted position.

11. The steering system according to claim 10, further comprising:
a rotating shaft that extends in a direction crossing the axial direction and coupled to the operation member, supports the second stopper member so that the second stopper member is movable in the crossing direction between the advanced position and the retracted position, and that rotates in conjunction with the operation of the operation member; and a conversion member supported by the rotating shaft to convert rotation of the rotating shaft into movement of the second stopper member in the crossing direction.

12. The steering system according to claim 10, wherein the operation member is supported by the lower jacket, and the second stopper member is provided on the operation member and moves integrally with the operation member to be operated, so that the second stopper member moves to the advanced position or to the retracted position.

* * * * *